(12) United States Patent
Lee

(10) Patent No.: US 11,586,298 B2
(45) Date of Patent: *Feb. 21, 2023

(54) DISPLAY APPARATUS AND CONTROLLING METHOD OF THE DISPLAY APPARATUS

(71) Applicant: SAMSUNG ELECTRONICS CO., LTD., Suwon-si (KR)

(72) Inventor: Taehoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 9 days.

This patent is subject to a terminal disclaimer.

(21) Appl. No.: 17/330,568

(22) Filed: May 26, 2021

(65) Prior Publication Data

US 2021/0286444 A1 Sep. 16, 2021

Related U.S. Application Data

(63) Continuation of application No. 16/588,411, filed on Sep. 30, 2019, now Pat. No. 11,054,916.

(30) Foreign Application Priority Data

Mar. 19, 2019 (KR) .................... 10-2019-0031087

(51) Int. Cl.
*G09G 5/00* (2006.01)
*G06F 3/03* (2006.01)
(Continued)

(52) U.S. Cl.
CPC .......... *G06F 3/03* (2013.01); *G02F 1/133308* (2013.01); *G06F 1/1684* (2013.01); *G06T 3/60* (2013.01); *G09G 5/005* (2013.01)

(58) Field of Classification Search
CPC ... G09G 2340/0492; G09G 2320/0261; G09G 2340/0407; G09G 3/20; G09G 5/005;
(Continued)

(56) References Cited

U.S. PATENT DOCUMENTS 5,134,390 A 7/1992 Kishimoto et al.
7,164,432 B1 * 1/2007 Amemiya ............. G06F 1/3203
345/649
(Continued)

FOREIGN PATENT DOCUMENTS

CN 205987139 U 2/2017
CN 109027627 A 12/2018
(Continued)

OTHER PUBLICATIONS

Communication (PCT/ISA/210) dated Jan. 21, 2020 by the International Searching Authority in counterpart International Patent Application No. PCT/KR2019/012692.
(Continued)

*Primary Examiner* — Thuy N Pardo
(74) *Attorney, Agent, or Firm* — Sughrue Mion, PLLC

(57) ABSTRACT

A display apparatus and a controlling method thereof are provided. The display apparatus includes: a display panel; at least one sensor configured to detect a distance to an external object; a driver configured to rotate the display panel while a front surface of the display panel maintains a facing direction; and a processor configured to: based on an event for rotating the display panel occurring, control the driver to rotate the display panel, and based on detecting, via the at least one sensor, the object within a predetermined distance in a rotating direction of the display panel while the display panel rotates, control the driver to stop rotating the display panel, wherein the predetermined distance has different values according to a rotating angle by which the display panel has rotated from a position of the display panel before the event occurred.

20 Claims, 26 Drawing Sheets

(51) Int. Cl.
*G02F 1/1333* (2006.01)
*G06T 3/60* (2006.01)
*G06F 1/16* (2006.01)

(58) Field of Classification Search
CPC ........ F16M 11/18; F16M 11/105; G06F 3/03; G06F 1/1684; G06T 3/60; G02F 1/133308; H04N 5/655
USPC ..... 345/156, 589, 649; 715/702; 361/679.04
See application file for complete search history.

(56) References Cited

U.S. PATENT DOCUMENTS

| | | |
|---|---|---|
| 2004/0047141 A1 | 3/2004 | An |
| 2006/0033760 A1* | 2/2006 | Koh ........................ G09G 5/363 345/649 |
| 2007/0171240 A1* | 7/2007 | Koh ........................ G09G 5/363 345/649 |
| 2008/0144267 A1 | 6/2008 | Tanaka et al. |
| 2010/0079494 A1 | 4/2010 | Sung et al. |
| 2010/0271340 A1 | 10/2010 | Nagashima et al. |
| 2011/0004821 A1* | 1/2011 | Miyazawa ............ G06F 3/0482 715/702 |
| 2011/0190034 A1 | 8/2011 | Shin |
| 2012/0203427 A1 | 8/2012 | Ehlgen et al. |
| 2014/0204024 A1 | 7/2014 | Kim et al. |
| 2014/0333567 A1 | 11/2014 | Mukai et al. |
| 2014/0351755 A1 | 11/2014 | Miyazawa et al. |
| 2015/0271409 A1* | 9/2015 | Imoto .................... H04N 5/341 345/589 |
| 2016/0109955 A1 | 4/2016 | Park et al. |
| 2016/0120507 A1* | 5/2016 | Ninomiya ............ G06F 3/1431 361/679.04 |
| 2017/0118463 A1* | 4/2017 | Li ........................ H04N 13/302 |
| 2017/0221456 A1 | 8/2017 | Kim et al. |
| 2017/0347034 A1 | 11/2017 | Iwasaki et al. |
| 2018/0008141 A1 | 1/2018 | Krueger |
| 2018/0081233 A1* | 3/2018 | Heo ................... G02F 1/133308 |
| 2018/0300052 A1 | 10/2018 | Ichinaka |
| 2019/0027097 A1 | 1/2019 | Kato |
| 2019/0245955 A1* | 8/2019 | Lee ...................... H04M 1/0237 |
| 2020/0026326 A1* | 1/2020 | Lee ....................... G06F 1/1616 |
| 2020/0051202 A1 | 2/2020 | Tamatam et al. |

FOREIGN PATENT DOCUMENTS

| | | |
|---|---|---|
| JP | 2008-258748 A | 10/2008 |
| JP | 2012-53533 A | 3/2012 |
| KR | 10-2006-0070195 A | 6/2006 |
| KR | 10-2006-0082926 A | 7/2006 |
| KR | 10-2008-0057019 A | 6/2008 |
| KR | 10-0844408 B1 | 7/2008 |
| KR | 10-2009-0126374 A | 12/2009 |
| KR | 10-2011-0122556 A | 11/2011 |
| KR | 10-2018-0039378 A | 4/2018 |

OTHER PUBLICATIONS

Communication (PCT/ISA/237) dated Jan. 21, 2020 by the International Searching Authority in counterpart International Patent Application No. PCT/KR2019/012692.

Communication dated Dec. 2, 2021 by the European Patent Office in counterpart European Patent Application No. 19919937.3.

* cited by examiner

DISPLAY APPARATUS AND CONTROLLING METHOD OF THE DISPLAY APPARATUS

CROSS-REFERENCE TO RELATED APPLICATION(S)

This application is a continuation of U.S. application Ser. No. 16/588,411 filed Sep. 30, 2019, which is based on and claims priority under 35 U.S.C. § 119 to Korean Patent Application No. 10-2019-0031087, filed on Mar. 19, 2019, in the Korean Intellectual Property Office, the disclosures of which are incorporated by reference herein in their entirety.

BACKGROUND

1. Field

The disclosure relates to a display apparatus and a controlling method of the display apparatus, and more particularly, to a display apparatus wherein a display panel rotates and a controlling method of the display apparatus.

2. Description of Related Art

With the evolution of electronic technologies, various display apparatuses that suit customers' needs are being developed. Among them, a display apparatus in which a display panel rotates is being developed for improving usefulness.

For example, depending on the resolution of an image to be displayed, there may be a case in which a change of the position or orientation of the display apparatus between a portrait position and a landscape position is beneficial. Also, in the case of a display apparatus such as a television (TV), change of a position or orientation may be beneficial according to the purpose of installation or the surrounding environment.

In this case, the display apparatus may provide a display environment appropriate for a particular situation by changing its position or orientation via rotating a display panel automatically according to occurrence of a rotation event.

Here, however, if the display apparatus rotates without consideration of the surrounding environment, collision with a person or an object that exists within the rotation radius may occur.

SUMMARY

Provided are a display apparatus which is capable of controlling rotation of a display panel by detecting a nearby obstacle, and a controlling method of the display apparatus.

Additional aspects will be set forth in part in the description which follows and, in part, will be apparent from the description, or may be learned by practice of the presented embodiments.

In accordance with an aspect of the disclosure, a display apparatus includes: a display panel; at least one sensor configured to detect a distance to an external object; a driver configured to rotate the display panel while a front surface of the display panel maintains a facing direction; and a processor configured to: based on an event for rotating the display panel occurring, control the driver to rotate the display panel, and based on detecting, via the at least one sensor, the object within a predetermined distance in a rotating direction of the display panel while the display panel rotates, control the driver to stop rotating the display panel, wherein the predetermined distance has different values according to a rotating angle by which the display panel has rotated from a position of the display panel before the event occurred.

The predetermined distance has a decreasing value as the rotating angle by which the display panel has rotated increases.

The driver may be configured to rotate the display panel in a forward direction from a first position to a second position perpendicular to the first position, in a reverse direction, opposite the forward direction, from the second position to the first position.

The at least one sensor may be arranged adjacent to at least one corner of the display panel.

The at least one sensor may include a first sensor and a second sensor respectively arranged adjacent to different corners on a first edge among two long edges on the display panel in a rectangular form, and a third sensor and a fourth sensor respectively arranged adjacent to different corners on a second edge among the two long edges.

The processor may be further configured to: based on the display panel rotating in a forward direction, detect the object via the first sensor and the third sensor located diagonally from each other; and based on the display panel rotating in a reverse direction, opposite the forward direction, detect the object via the second sensor and the fourth sensor located diagonally from each other.

The first sensor and the third sensor may be arranged such that a detecting direction is toward the forward direction; and the second sensor and the fourth sensor may be arranged such that the detecting direction is toward the reverse direction.

The processor may be further configured to: based on the display panel rotating in the forward direction, control to increase arrangement angles of the first sensor and the third sensor in the reverse direction as the rotating angle increases; and based on the display panel rotating in the reverse direction, control to increase arrangement angles of the second sensor and the fourth sensor in the forward direction as the rotating angle increases.

The processor may be further configured to: based on the event occurring, control the at least one sensor to detect whether the object exists within the predetermined distance before rotating the display panel, and based on the object being detected within the predetermined distance before rotating the display panel, control the driver not to rotate the display panel, and based on the object not being detected within the predetermined distance before rotating the display panel, control the driver to rotate the display panel.

The processor may be further configured to, based on the object being detected within the predetermined distance before or while the display panel rotates, control the display panel to display a notification message.

The processor may be further configured to: based on an object not being detected within the predetermined distance within a predetermined time period after the object is detected and rotation of the display panel is stopped, control the driver to resume rotation of the display panel; and based on the object being continuously detected within the predetermined distance during the predetermined time period, control the driver to return the display panel to a position before the event occurred.

The processor may be further configured to, based on the object being detected within the predetermined distance, stop the rotation of the display panel and control the driver to return the display panel to a position before the event occurred.

In accordance with another aspect of the disclosure, a controlling method of a display apparatus including a display panel, includes: based on an event for rotating the display panel occurring, rotating the display panel while a front surface of the display panel maintains a facing direction; detecting, via at least one sensor, a distance to an external object while the display panel rotates; and based on detecting the object within the predetermined distance in a rotating direction of the display panel, stopping the rotating of the display panel, wherein the predetermined distance has different values according to a rotating angle by which the display panel has rotated from a position of the display panel before the event occurred.

The predetermined distance may have a decreasing value as the rotating angle by which the display panel has rotated increases.

The display panel may be rotatable in a forward direction from a first position to a second position perpendicular to the first position, and may be rotatable in a reverse direction, opposite the forward direction, from the second position to the first position.

The at least one sensor may include a first sensor and a second sensor respectively arranged adjacent to different corners on a first edge among two long edges on the display panel in a rectangular form, and a third sensor and a fourth sensor respectively arranged adjacent to different corners on a second edge among the two long edges.

The detecting may include: based on the display panel rotating in a forward direction, detecting the object via the first sensor and the third sensor located diagonally from each other; and based on the display panel rotating in a reverse direction, opposite the forward direction, detecting the object via the second sensor and the fourth sensor located diagonally from each other.

The controlling method may further include: based on the display panel rotating in the forward direction, increasing arrangement angles of the first sensor and the third sensor in the reverse direction as the rotating angle increases; and based on the display panel rotating in the reverse direction, increasing the arrangement angles of the second sensor and the fourth sensor in the forward direction as the rotating angle increases.

The controlling method may further include: based on the event occurring, detecting whether the object exists within the predetermined distance before rotating the display panel; and based on the object being detected within the predetermined distance before rotating the display panel, not rotating the display panel, and based on the object not being detected within the predetermined distance before rotating the display panel, rotating the display panel.

The controlling method may further include, based on the object being detected within the predetermined distance before or while the display panel rotates, outputting a notification message.

In accordance with another aspect of the disclosure, a display apparatus includes: a display panel; at least one sensor configured to detect whether an object exists within a predetermined distance of the display panel along a rotational path of the display panel; a processor configured to execute instructions to, based on detecting, via the at least one sensor, the object within the predetermined distance in the rotational path of the display panel, control the display panel to not rotate, wherein the predetermined distance has different values according to a rotating angle by which the display panel has rotated from a position of the display panel before the event occurred.

The at least one sensor may be configured to detect whether the object exists within the predetermined distance of the display panel while the display panel rotates along the rotational path; and the processor may be configured to execute the instructions to, based on detecting, via the at least one sensor, the object within the predetermined distance while the display panel rotates, control the display panel to stop rotating.

The at least one sensor may be configured to detect whether the object exists within the predetermined distance of the display panel before the display panel rotates along the rotational path; and the processor may be configured to execute the instructions to, based on detecting, via the at least one sensor, the object within the predetermined distance before the display panel rotates, control the display panel to not rotate.

The at least one sensor may be further configured to detect whether the object exists within the predetermined distance of the display panel while the display panel rotates along the rotational path; and the processor may be further configured to execute the instructions to: based on detecting, via the at least one sensor, that the object does not exist within the predetermined distance before the display panel rotates, control the display panel to rotate along the rotational path; and based on detecting, via the at least one sensor, the object within the predetermined distance while the display panel rotates, control the display panel to stop rotating.

The predetermined distance may have a decreasing value as the rotating angle by which the display panel has rotated increases.

The at least one sensor may include a first sensor and a second sensor respectively arranged adjacent to different corners on a first edge among two long edges on the display panel in a rectangular form, and a third sensor and a fourth sensor respectively arranged adjacent to different corners on a second edge among the two long edges.

The processor may be further configured to execute the instructions to: based on the display panel rotating in a forward direction, detect the object via the first sensor and the third sensor located diagonally from each other; and based on the display panel rotating in a reverse direction, opposite the forward direction, detect the object via the second sensor and the fourth sensor located diagonally from each other.

The first sensor and the third sensor may be arranged such that a detecting direction is toward the forward direction; and the second sensor and the fourth sensor may be arranged such that the detecting direction is toward the reverse direction.

The processor may be further configured to execute the instructions to: based on the display panel rotating in the forward direction, control to increase arrangement angles of the first sensor and the third sensor in the reverse direction as the rotating angle increases; and based on the display panel rotating in the reverse direction, control to increase arrangement angles of the second sensor and the fourth sensor in the forward direction as the rotating angle increases.

The processor may be further configured to execute the instructions to, based on the object being detected within the predetermined distance before or while the display panel rotates, control the display panel to display a notification message.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

In describing embodiments, where a detailed explanation of related known technologies may unnecessarily confuse the gist of the disclosure, the detailed explanation may be omitted or abridged. Also, overlapping or redundant explanations of the same components or operations may be omitted below.

The suffix "part" for components used in the description below is added or interchangeably used for convenience of description, and the term itself does not have a distinguished meaning or role.

The terms used in the disclosure are used for describing embodiments, and are not intended to restrict and/or limit the disclosure. Also, singular expressions include plural expressions, unless a context indicates otherwise.

In the disclosure, terms such as "include" and "have" should be interpreted as designating that there are such characteristics, numbers, steps, operations, elements, components or a combination thereof described in the specification, but not to exclude in advance the existence or possibility of one or more additional other characteristics, numbers, steps, operations, elements, components or a combination thereof.

Also, the expressions "first," "second," and the like used in the disclosure may be used to describe various elements regardless of any order and/or degree of importance. Also, such expressions are used only to distinguish one element from another element, and are not intended to limit the elements.

In addition, the description in the disclosure that one element (e.g., a first element) is "(operatively or communicatively) coupled with/to" or "connected to" another element (e.g., a second element) should be interpreted to include both the case where the one element is directly coupled to the another element, and the case where the one element is coupled to the another element through still another element (e.g., a third element). In contrast, the description that one element (e.g., a first element) is "directly coupled" or "directly connected" to another element (e.g., a second element) can be interpreted to mean that still another element (e.g., a third element) does not exist between the one element and the another element. It is understood that, hereinafter, expressions such as "at least one of," when preceding a list of elements (e.g., "at least one of A and B" or "at least one of A or B"), modify the entire list of elements (i.e., only A, only B, or both A and B) and do not modify the individual elements of the list.

Meanwhile, the terms used in the embodiments may be interpreted as meanings generally known to those of ordinary skill in the art described in the disclosure, unless defined differently in the disclosure.

Hereinafter, various embodiments will be described in detail with reference to the accompanying drawings.

Figure 1A:
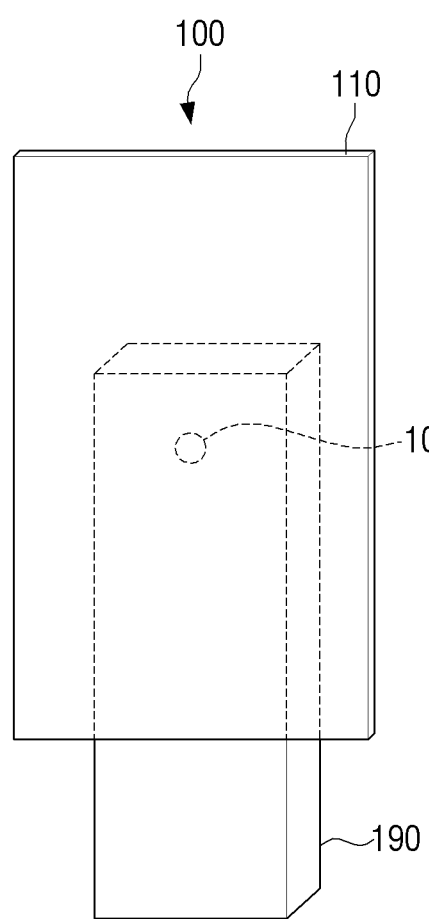
FIG. 1A is a diagram for illustrating rotation of a display panel according to an embodiment.
Figure 1B:
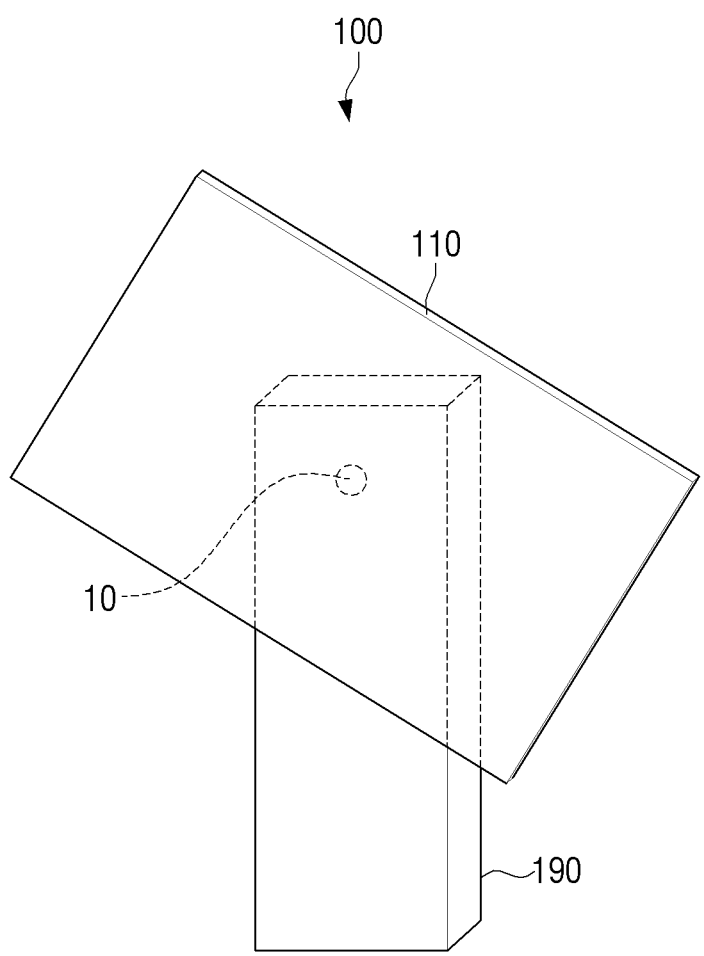
FIG. 1B is a diagram for illustrating rotation of a display panel according to an embodiment.
Figure 1C:
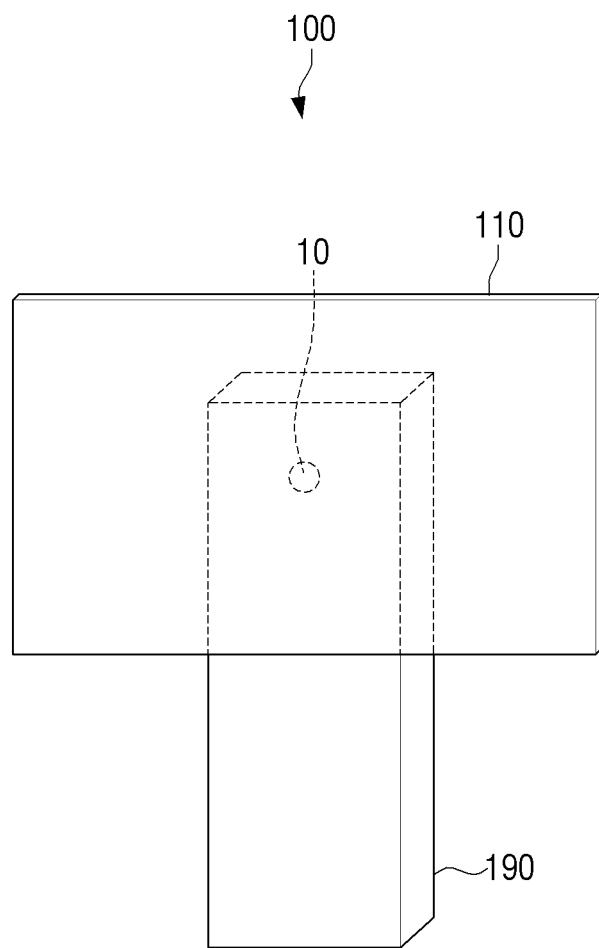
FIG. 1C is a diagram for illustrating rotation of a display panel according to an embodiment.

FIGS. 1A to 1C are diagrams for illustrating operations of a display apparatus 100 according to an embodiment.

According to FIGS. 1A to 1C, a display apparatus 100 includes a display panel 110 and a support 190 for supporting the display panel 110. In FIGS. 1A to 1C, an example in which the display panel 110 is a flat surface is shown. However, it is understood that one or more other embodiments are not limited thereto. For example, according to another embodiment, the display panel 110 may have a bent or curved shape. Also, the display apparatus 100 may be implemented without the support 190 depending on embodiments, e.g., where the display apparatus 100 is wall-mounted with a rotational motor and/or driver.

If an event for rotating the display panel 110 occurs, the display apparatus 100 may rotate the display panel 110. Here, an event for rotating the display panel 110 may be, for example, a user command for rotating the display panel 110, advent of a predetermined time point, change of the resolution of an image to be displayed, etc., but is not limited thereto.

The display panel 110 may rotate with a rotation center 10 as the center while the direction that its front surface is toward is fixed, as illustrated in FIGS. 1A to 1C. Here, the direction that the front surface faces refers to the direction that the screen of the display panel 110 faces.

According to an embodiment, the display panel 110 may rotate between a portrait position (or a position in a vertical direction in which a height is greater than a width) and a landscape position (or a position in a horizontal direction in which a width is greater than a height).

Here, a portrait position refers to a position (or orientation) in which the display panel 110 is arranged in a form wherein its vertical length is longer than its horizontal length based on the ground, and a landscape position refers to a position (or orientation) in which the display panel 110 is arranged in a form wherein its horizontal length is longer than its vertical length. Here, the display panel 110 may be in a rectangular form.

For example, if a user command for rotating the display panel 110 is input while the display panel 110 is in a portrait position as in FIG. 1A, the display panel 110 may rotate in a counterclockwise direction and go through a position as in FIG. 1B, before settling in a landscape position illustrated in FIG. 1C. Alternatively, if a user command for rotating the display panel 110 is input while the display panel 110 is in a landscape position as in FIG. 1C, the display panel 110 may rotate in a clockwise direction and go through a position as in FIG. 1B, and stop in a portrait position illustrated in FIG. 1A.

It is understood that one or more other embodiments wherein the display panel 110 rotates are not limited to what is illustrated in FIGS. 1A to 1C. For example, the display panel 110 may rotate in a clockwise direction in a portrait position to reach a landscape position, or rotate in a counterclockwise direction in a landscape position to reach a portrait position.

Also, while it has been described that the display panel 110 rotates by 90 degrees in a counterclockwise or clockwise direction and to have a portrait position or a landscape position, these are merely examples and it is understood that one or more other embodiments are not limited thereto. For example, the display panel 110 may rotate by 90 degrees in a counterclockwise or clockwise direction from a portrait position to have a landscape position, and may further rotate by 90 degrees in the same direction from a landscape position to have a portrait position.

When the display panel 110 rotates as described above, in case a person or an object exists in the rotating radius of the display panel 110, a collision may occur. To prevent such a collision, the display apparatus 100 may detect whether an object (or an obstacle) exists within a predetermined distance in the direction in which the display panel 110 rotates, and if an object is detected within a predetermined distance, the display apparatus 100 may stop rotation of the display panel 110.

Specifically, according to an embodiment, in an area adjacent to the corner of the display panel 110, a sensor that can detect distance to or presence of an object may be included. Accordingly, the display apparatus 100 may detect whether an object exists within a predetermined distance in the direction in which the display panel 110 rotates through a sensor.

Here, in case an object exists outside the rotating range of the display panel 110, collision will not occur even if the display panel 110 rotates. Thus, it is not appropriate to stop the display panel 110 even in a case in which an object is detected outside the rotating range.

As such, the predetermined distance is adjusted appropriately. According to an embodiment, the display apparatus 100 may dynamically adjust the predetermined distance while the display panel 110 rotates. In particular, while the display panel 110 rotates from a first position to a second position, a distance by which the display panel 110 is to be rotated decreases gradually. Thus, the display apparatus 100 may perform adjustment such that the predetermined distance has a smaller value as the rotating angle of the display panel 110 increases.

Accordingly, the display apparatus 100 or the display panel 110 can be rotated safely.

As described above, the display apparatus 100 may be implemented as various display apparatuses such as a TV, a monitor, an electronic picture frame, an electronic blackboard, an electronic table, a laptop computer, a large format display (LFD), a digital sign, an electronic billboard, etc.

Figure 2:
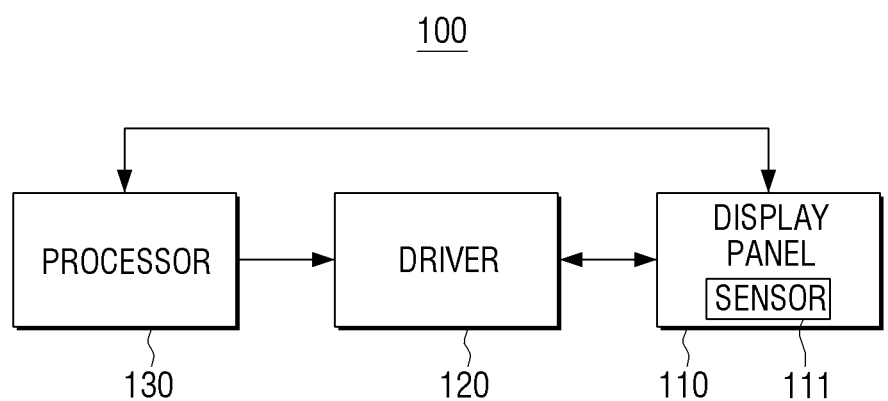
FIG. 2 is a block diagram of a display apparatus according to an embodiment.

FIG. 2 is a block diagram of a display apparatus 100 according to an embodiment. Referring to FIG. 2, a display apparatus 100 includes a display panel 110, a driver 120, and a processor 130.

The display panel 110 may display images. The display panel 110 may be various types of display panels such as a liquid crystal display (LCD) panel, an organic light emitting diode (OLED) panel, a plasma display panel (PDP), an inorganic LED panel, a micro LED panel, etc.

In particular, the display panel 110 may rotate as described above with reference to FIGS. 1A to 1C, according to driving of the driver 120. Here, the display panel 110 may rotate with a rotation center 10 as the center while its front surface maintains a specific facing direction. Here, the rotation center 10 may be located in the geometric center of the display panel 110, but is not necessarily limited thereto, and may be located in another location of the display panel 110 or the display apparatus 100.

According to an embodiment, the display panel 110 may rotate between a first position and a second position perpendicular to the first position. That is, the display panel 110 may rotate in a forward direction from a first position to have a second position, and may rotate in a reverse direction from a second position to have a first position.

Here, the first position may be any one of a portrait position or a landscape position, and the second position may be the other one of the portrait position or the landscape position. Also, the forward direction may be any one of a counterclockwise direction or a clockwise direction, and the reverse direction may be the other one of the counterclockwise direction or the clockwise direction.

Figure 3A:
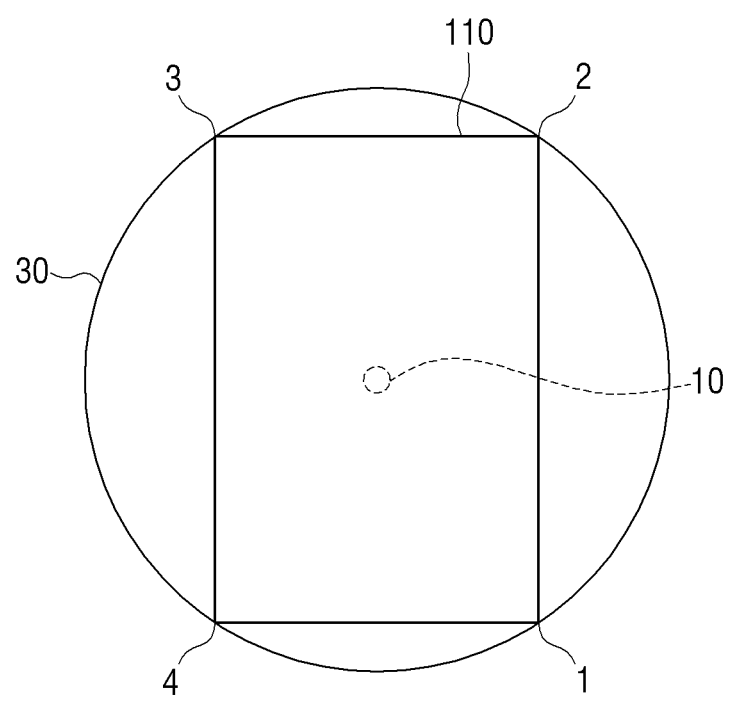
FIG. 3A is a diagram for illustrating a rotation radius and a position of a display panel according to an embodiment.
Figure 3B:
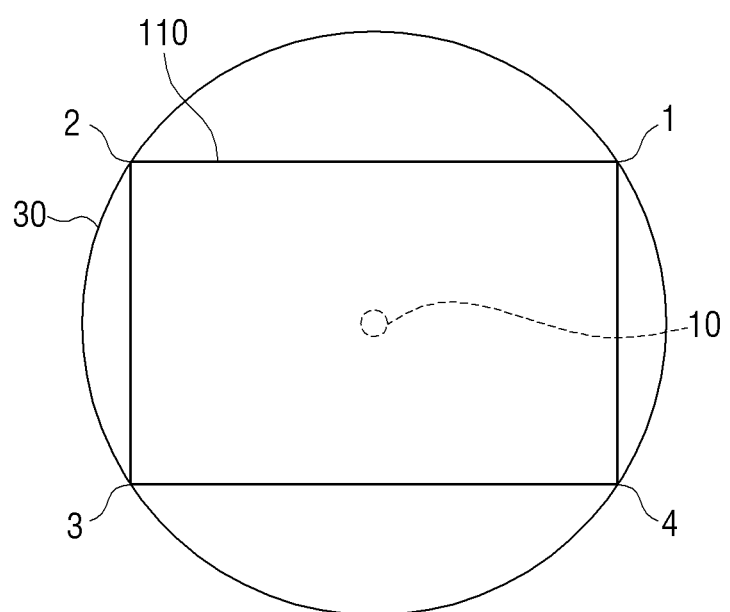
FIG. 3B is a diagram for illustrating a rotation radius and a position of a display apparatus according to an embodiment.

FIG. 3A illustrates the display panel 110 in a portrait position, and FIG. 3B illustrates the display panel 110 in a landscape position. Hereinafter, for the convenience of explanation, an embodiment will be described wherein the first position is a portrait position, the second position is a landscape position, the forward direction is a counterclockwise direction, and the reverse direction is a clockwise direction.

Meanwhile, the display panel 110 may include a sensor 111 detecting distance to or presence of an external object. Here, the sensor 111 may be arranged in an area adjacent to the corner of the display panel 110.

As illustrated in FIGS. 3A and 3B, the display panel 110 in a rectangular form has a rotating range 30 in a circular form through which four corners 1 to 4 pass at the time of rotation. Accordingly, to prevent collision by detecting an object in the rotating range 30 in advance when the display panel 110 rotates, according to an embodiment, the sensor 111 may be arranged in an area adjacent to the corners 1 to 4 of the display panel 110.

Figure 3C:
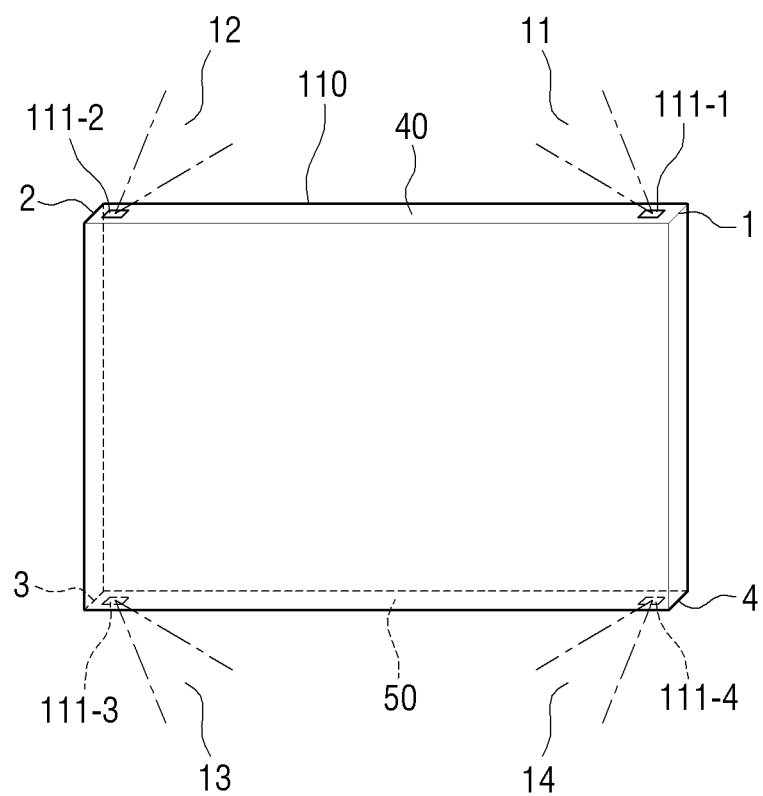
FIG. 3C is a diagram for illustrating arrangement of a sensor according to an embodiment.

FIG. 3C illustrates an example wherein four sensors 111-1 to 111-4 are arranged in areas adjacent to each corner 1 to 4 of the display panel 110. Specifically, according to an embodiment, the display panel 110 in a rectangular form may include a first sensor 111-1 and a second sensor 111-2 arranged to be respectively adjacent to different corners 1, 2 on a first edge 40 between two long edges 40, 50, and a third sensor 111-3 and a fourth sensor 111-4 arranged to be respectively adjacent to different corners 3, 4 on a second edge 50.

Figure 4A:
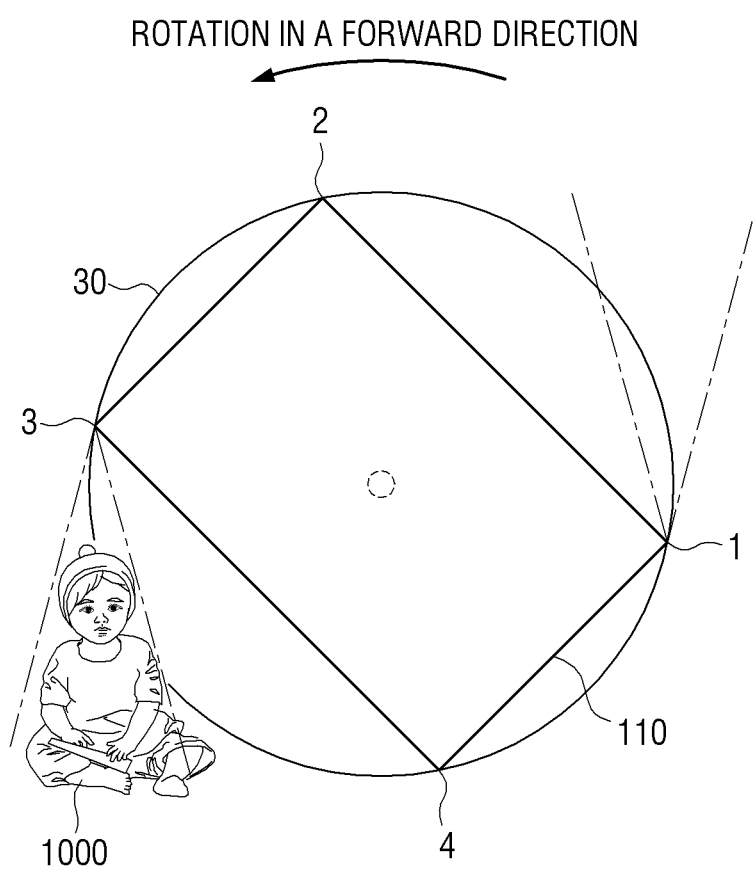
FIG. 4A is a diagram illustrating an example of detecting an obstacle when a display panel rotates in a forward direction according to an embodiment.
Figure 4B:
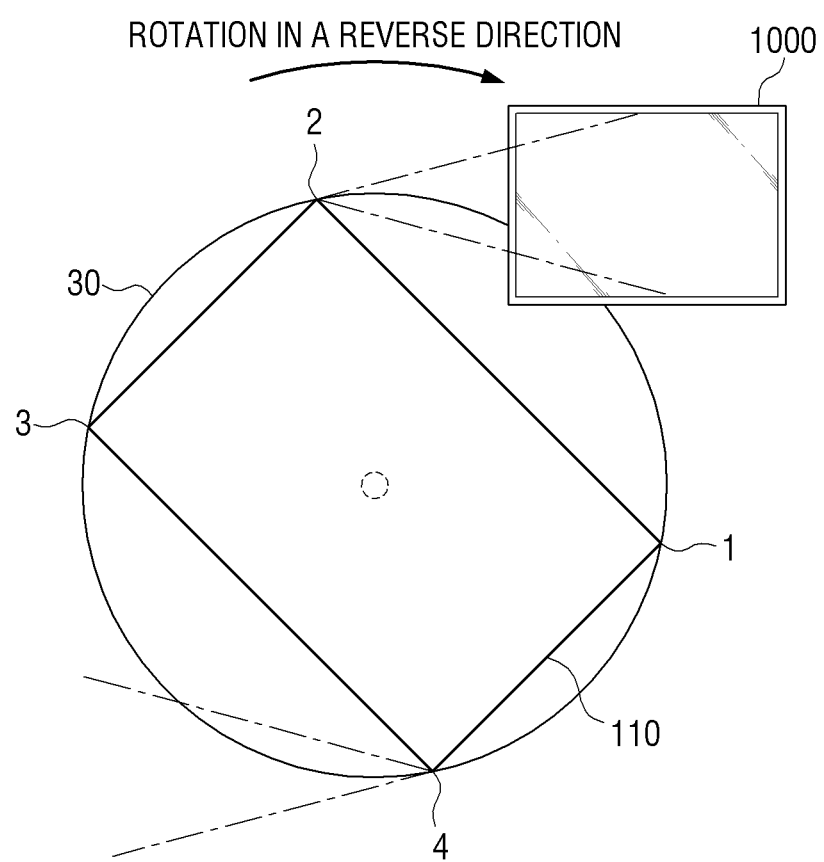
FIG. 4B is a diagram illustrating an example of detecting an obstacle when a display panel rotates in a reverse direction according to an embodiment.

Here, according to an embodiment, in case the display panel 110 rotates in a forward direction as illustrated in FIG. 4A, an object 1000 in the rotating range 30 may be detected by using the first sensor 111-1 and the third sensor 111-3 located in the corners 1, 3 in a diagonal direction. Meanwhile, in case the display panel 110 rotates in a reverse direction as illustrated in FIG. 4B, the object 1000 may be detected by using the second sensor 111-2 and the fourth sensor 111-4 located in the corners 2, 4 in a diagonal direction.

To this end, according to an embodiment, as illustrated in FIG. 3C, the first and third sensors 111-1, 111-3 may be arranged such that the detecting directions 11, 13 are toward a forward direction, and the second and fourth sensors 111-2, 111-4 may be arranged such that the detecting directions 12, 14 are toward a reverse direction.

Meanwhile, the sensor 111 may be implemented as various sensors such as an infrared sensor, an ultrasonic sensor, a Light Detection and Ranging (LIDAR) sensor, a radar sensor, a camera sensor, an image sensor, etc.

The driver 120 controls rotation of the display panel 110. Specifically, the driver 120 may be connected to the display panel 110, and may rotate the display panel 110 or stop the rotation of the display panel 110 according to control of the processor 130. Here, the driver 120 may rotationally drive the display panel 110 at a specific angular velocity, but is not limited thereto.

For this, the driver 120 may include a motor (e.g., an alternating current (AC) motor, a direct current (DC) motor, a step motor, a variable speed motor, etc.) that can generate rotating force and various types of members (e.g., a driving shaft, a driving gear, etc.) for transmitting the rotating force (or torque) of the motor to the display panel 110.

The processor 130 (e.g., at least one processor) controls the overall operations of the display apparatus 100. In particular, when an event for rotating the display panel 110 occurs, the processor 130 may control the driver 120 such that the display panel 110 rotates.

Here, a rotation event may be an event in which a user command for rotating the display panel 110 is input, an event in which a predetermined time period arrives or passes, an event in which the resolution of an image to be displayed and the position of the display panel 110 do not match each other, an event in which a control signal for rotating the display panel 110 is received from an external device, etc. It is understood, however, that a rotation event is not limited thereto.

Specifically, when a user command for rotating the display panel 110 is input, the processor 130 may rotate the display panel 110. For example, if change of the position of the display panel 110 is needed or is appropriate, a user may input a user command for rotating the display panel 110 by selecting a specific button provided on the display apparatus 100 or a remote controller or selecting a menu displayed on the display panel 110. If a user command is input, as described above, the processor 130 may control the driver 120 such that the display panel 110 rotates.

Also, a user may set a time point when the position of the display panel 110 will be changed on the display apparatus 100. When a time point set by a user in advance as described above arrives, the processor 130 may control the driver 120 such that the display panel 120 rotates.

In addition, in case the resolution of an image to be displayed and the current position of the display panel 110 do not match or correspond to each other, the processor 130 may rotate the display panel 110. For example, the processor 130 may determine that an image having a resolution in which the horizontal length is longer (greater) than the vertical length matches or corresponds to a landscape position, and an image having a resolution in which the vertical length is longer (greater) than the horizontal length matches or corresponds to a portrait position.

Accordingly, if a reproduction command for an image having a resolution in which the horizontal length is longer (greater) than the vertical length is input while the display panel 110 is in a portrait position, the processor 130 may determine that the image and the position of the display panel 110 do not match or correspond to each other, and may control to rotate the display panel 110 to a landscape position. In contrast, if a reproduction command for an image having a resolution in which the vertical length is longer (greater) than the horizontal length is input while the display panel 110 is in a landscape position, the processor 130 may control to rotate the display panel 110 to a portrait position.

Meanwhile, the processor 130 may detect distance to or in-path presence of an external object through the sensor 111 while the display panel 110 rotates. Accordingly, if an object is detected within a predetermined distance in the rotating direction of the display panel 110, the processor 130 may control the driver 120 such that the rotation of the display 110 stops.

Here, a predetermined distance is a distance wherein, in case an object is detected within the distance, the rotation of the display panel 110 stops. Thus, collision with an object that exists in the rotating range 30 of the display panel 110 can be prevented by setting a predetermined distance appropriately.

Meanwhile, as described above, there is no need that the rotation of the display panel 110 stops even in a case wherein an object exists outside the rotating range of the display panel 110. Thus, there is a need to set a predetermined distance appropriately.

According to an embodiment, a predetermined distance may have different values according to the rotating angle of the display panel 110. In particular, a predetermined distance may be set to have a smaller value as the rotating angle increases. Here, a rotating angle refers to an angle by which the display panel 110 rotates based on the position of the display panel 110 before the display panel 110 starts to rotate.

Information on a predetermined distance value according to the rotating angle of the display panel 110 may be calculated in advance and stored in the display apparatus 100, and the processor 130 may dynamically change the predetermined distance based on the stored information.

Meanwhile, according to an embodiment, the processor 130 may detect an external object before the display panel 110 rotates, and determine whether to rotate the display panel 110 according to whether an object is detected within a predetermined distance.

Specifically, the processor 130 may not start rotation of the display panel 110 immediately in case a rotation event occurs, but control the sensor 111 to detect or check for an object before rotating the display panel 110. Accordingly, if an object is detected within a predetermined distance, the processor 130 may not control to rotate the display panel 110, and if an object is not detected within a predetermined distance, the processor 130 may control the driver 120 such that the display panel 110 rotates.

FIGS. 5A to 5D illustrate a change in a predetermined distance related to a sensor 111-3 arranged in an area adjacent to a corner 3 while the display panel 110 in the first position rotates in a forward direction to have the second position.

In the examples of FIGS. 5A to 5D, the size of the display panel 110 is 43 inches (109.22 cm). Also, an example in which a sensor 111-3 of which maximum detecting distance is 4 meters and detecting range (or detecting angle) x is 30 degrees is arranged by an arrangement angle y of 30 degrees based on the second edge 50 surface of the display panel 110 is provided.

Figure 5A:
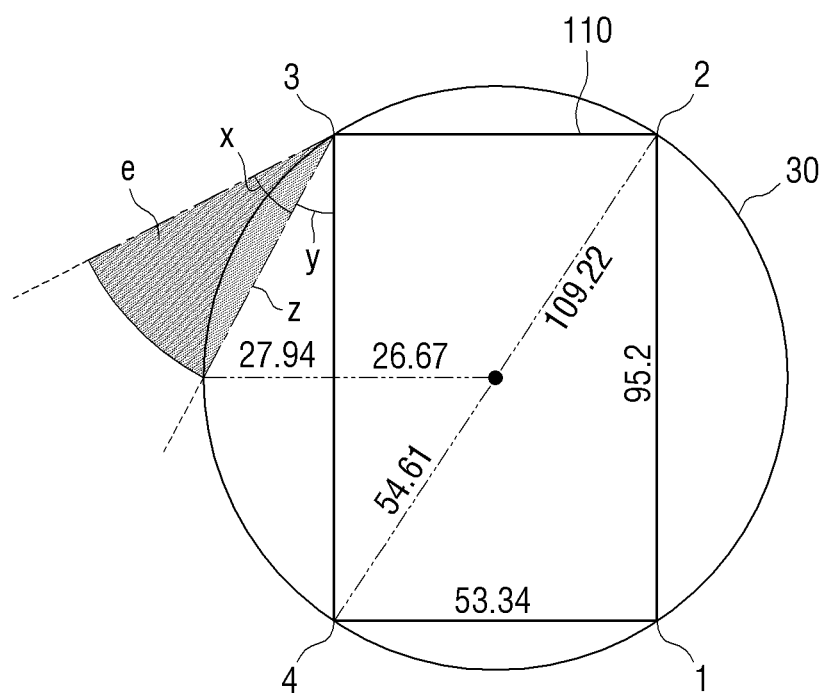
FIG. 5A is a diagram for illustrating an embodiment wherein detecting distance of an obstacle changes according to a rotating angle of a display panel.

As illustrated in FIG. 5A, if a rotation event occurs while the display panel 110 is in the first position, the processor 130 may control the sensor 111-3 to detect an external object first before rotating the display panel 110.

In this case, detecting an object is for determining whether an obstacle exits in the rotating range 30 first before the display panel 110 rotates according to a rotation event. Thus, according to an embodiment, 55.12 cm which is the maximum distance of the rotating radius of the display panel 110 can be used as a predetermined distance z, as illustrated in FIG. 5A. (55.12 cm can be easily derived from the numerical values (in units of cm) illustrated in FIG. 5A.)

Accordingly, if an object is detected within the shadow portion in FIG. 5A, the processor 130 does not rotate the display panel 110, but rotates the display panel 110 outside the shadow portion even if an object is detected.

If the display panel 110 starts rotating, the processor 130 may determine whether an obstacle exists in the rotating range 30 while the display panel 110 rotates, and the processor 130 may control the rotation of the display panel 110 accordingly. Specifically, if an object is detected within a predetermined distance z through the sensor 111-3, the processor 130 may control the driver 120 to stop the rotation of the display panel 110.

Figure 5B:
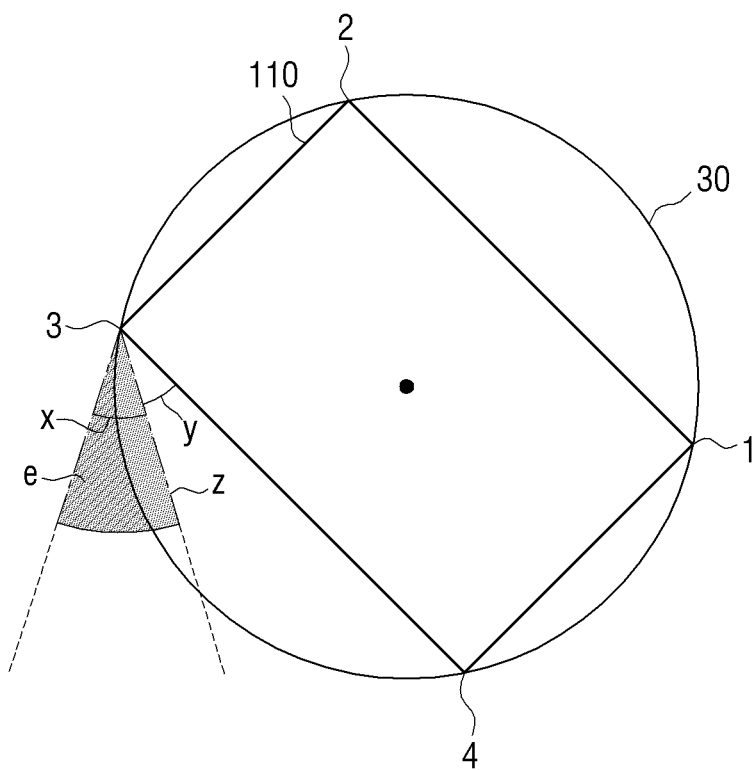
FIG. 5B is a diagram for illustrating an embodiment wherein detecting distance of an obstacle changes according to a rotating angle of a display panel.
Figure 5C:
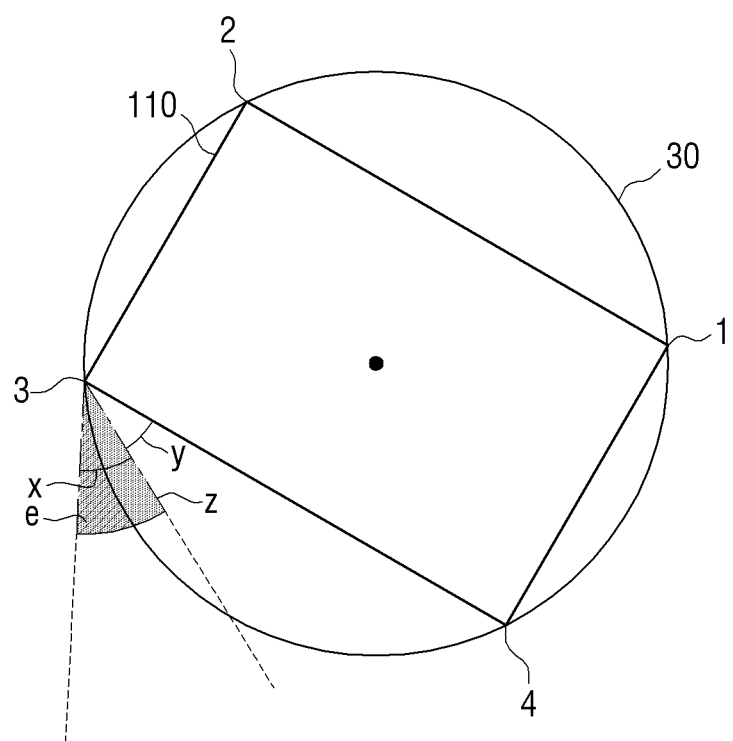
FIG. 5C is a diagram for illustrating an embodiment wherein detecting distance of an obstacle changes according to a rotating angle of a display panel.
Figure 5D:
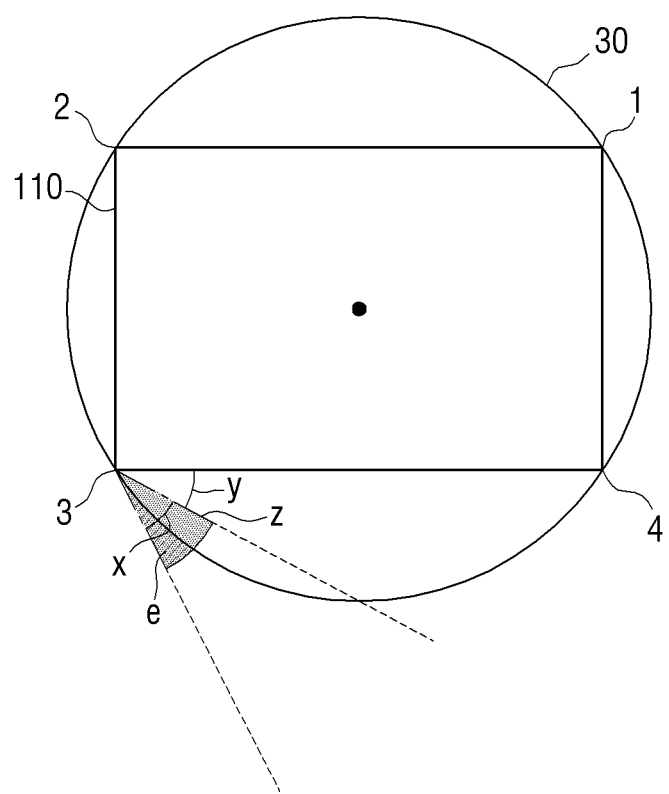
FIG. 5D is a diagram for illustrating an embodiment wherein detecting distance of an obstacle changes according to a rotating angle of a display panel.

FIGS. 5B to 5D illustrate cases in which the rotating angles after the rotation of the display panel 110 starts is around 30 degrees, 45 degrees, and 90 degrees, respectively. Accordingly, as illustrated in FIGS. 5B to 5D, if an object is detected within each shadow portion while the display panel 110 rotates, the processor 130 may stop the rotation of the display panel 110.

Here, referring to the shadow portions in FIGS. 5A to 5D, it can be seen that an area e that is outside the rotating range 30 of the display panel 110 is included in the shadow portion. It is understood, however, that before or when the display panel 110 rotates, collision with an object occurs only when an object exists in the rotating range 30.

Thus, according to an embodiment, by changing the predetermined distance z according to the rotating angle of the display panel 110 appropriately, the error that the display panel 110 does not rotate when an obstacle that exists outside the rotating range 30 is detected is reduced.

Specifically, the distance that the corner 3 should move while the display panel 110 rotates from the first position to the second position is the longest in the first position, and is reduced as the rotating angle of the display panel 120 increases. That is, as the rotating angle of the display panel 110 increases, there is no need to detect an obstacle that exists far away. Also, as the predetermined distance z is smaller, the length of the shadow portion is reduced, and thus erroneous detections of objects outside the rotational path 30 of the display panel 110 are reduced.

As described above, according to an embodiment, as the rotating angle increases, a predetermined distance z of a smaller value is applied, as illustrated in FIGS. 5A to 5D, and the aforementioned error can be reduced as an obstacle in the rotating range 30 is detected appropriately. That is, in case an obstacle that exists outside the rotating range 30 is detected even though it is inside the shadow portion (i.e., in case an object was detected in the e area), the error that the display panel 110 does not rotate can be reduced.

Figure 6:
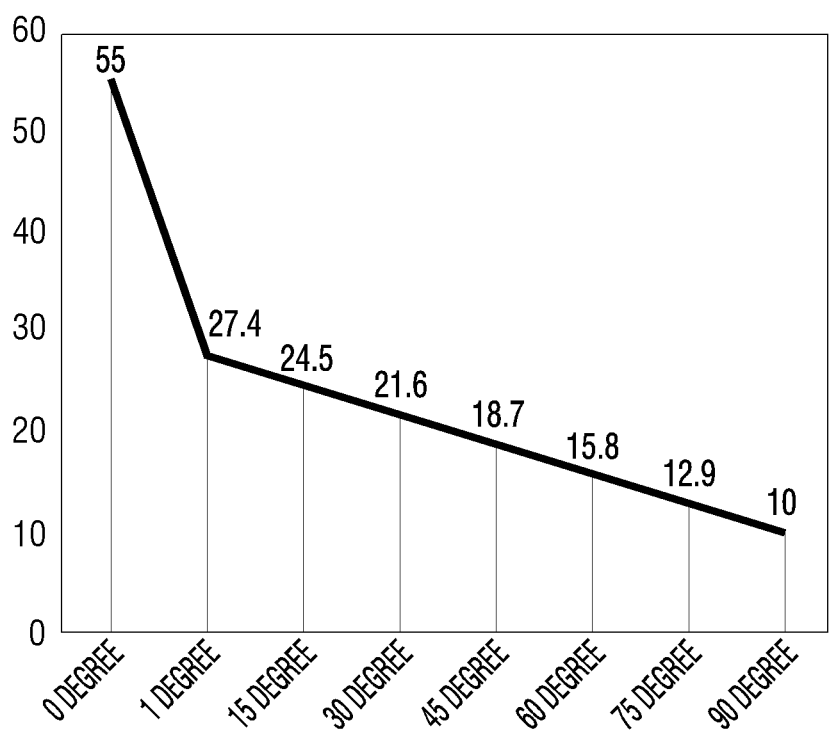
FIG. 6 is an exemplary graph illustrating a change in detecting distance of an obstacle according to a rotating angle of a display panel.
Figure 7A:
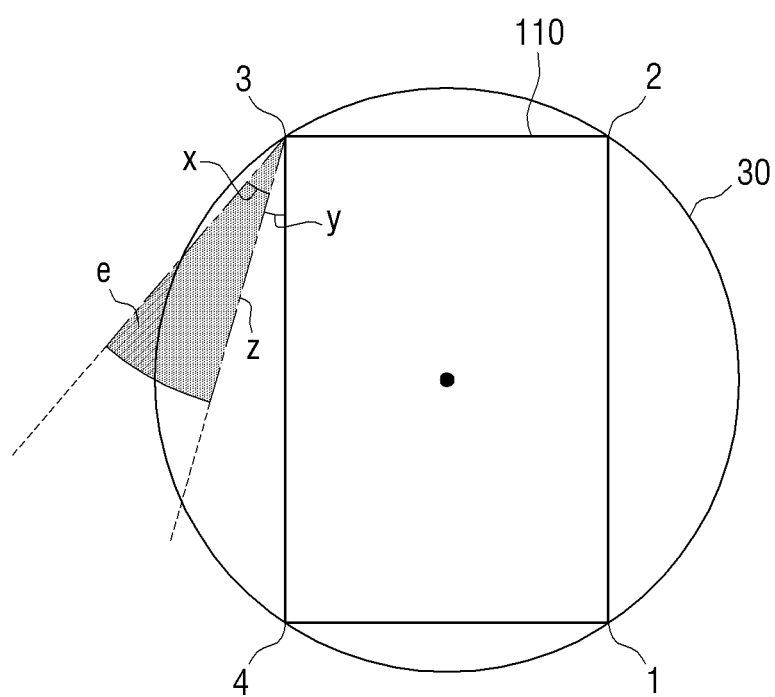
FIG. 7A is a diagram for illustrating another embodiment wherein detecting distance of an obstacle changes according to a rotating angle of a display panel.
Figure 7B:
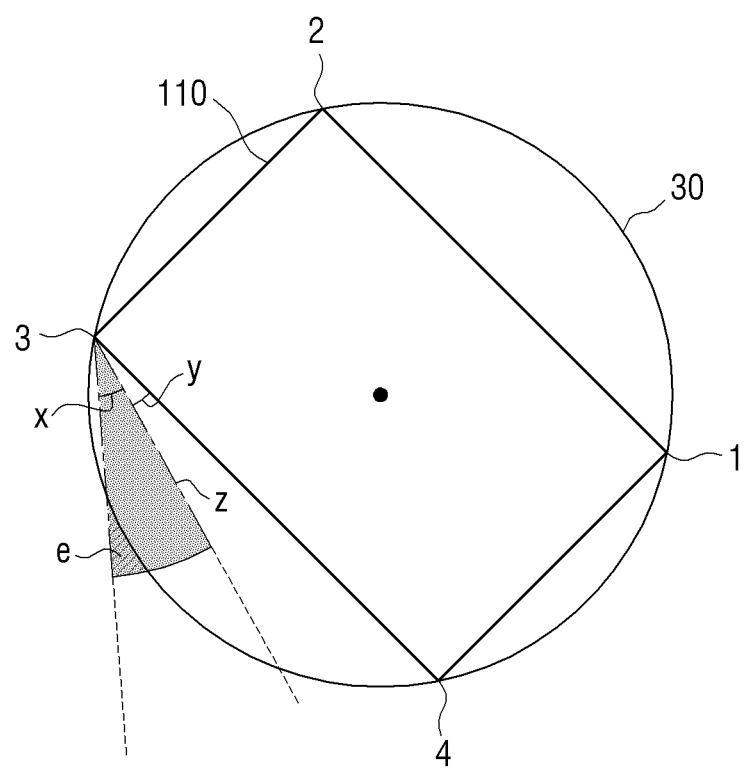
FIG. 7B is a diagram for illustrating another embodiment wherein detecting distance of an obstacle changes according to a rotating angle of a display panel.
Figure 7C:
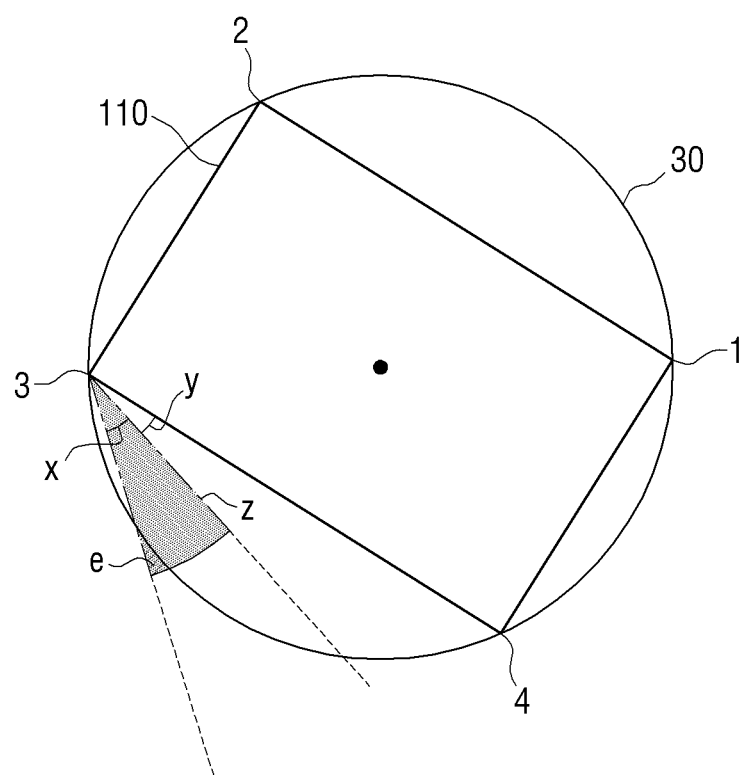
FIG. 7C is a diagram for illustrating another embodiment wherein detecting distance of an obstacle changes according to a rotating angle of a display panel.
Figure 7D:
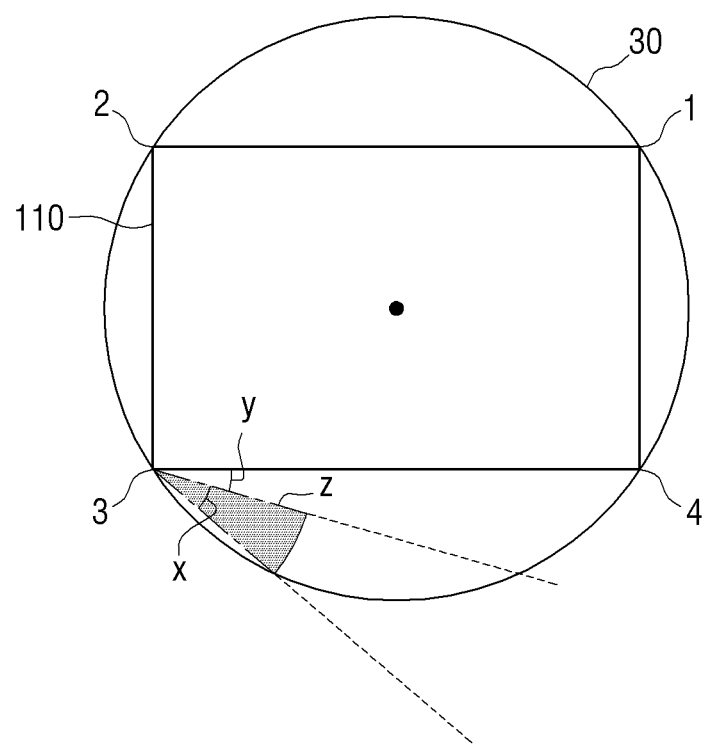
FIG. 7D is a diagram for illustrating another embodiment wherein detecting distance of an obstacle changes according to a rotating angle of a display panel.

FIG. 6 is an exemplary graph illustrating a change in detecting distance of an obstacle (a predetermined distance) according to a rotating angle of a display panel. Specifically, the x axis in FIG. 6 indicates a rotating angle of the display panel 110, and the y axis indicates a predetermined distance z.

As illustrated in FIG. 6, according to an embodiment, it can be seen that the predetermined distance z is set to become smaller as the rotating angle of the display panel 110 becomes bigger. The display apparatus 100 may store information on the predetermined distance according to the rotating angle as illustrated in FIG. 6, and the processor 130 may dynamically adjust the predetermined distance z according to the rotating angle of the display panel 110 with reference to the stored information.

It is understood, however, that the data in FIG. 6 is merely an example, and detailed data (e.g., predetermined distance data) may vary or be changed or adjusted by logical calculation, calibration, experimentation, testing, etc.

Further, while the above description is with reference to an example of the operation of one sensor 111-3, it is understood that the operations of the other sensors are similar to the operation of the sensor 111-3, but vary with respect to their arrangement locations and angles. Thus, the operations can be understood sufficiently through the explanation above.

Meanwhile, it is understood that the types or arrangement angles of the sensor 111 are not limited to what are illustrated in FIGS. 5A to 5D in one or more other embodiments. For example, FIGS. 7A to 7D illustrate a case in which the sensor 111 having a different detecting angle x from the sensors in FIGS. 5A to 5D is arranged at a different arrangement angle y, and cases wherein the rotating angles of the display panel 110 are 0 degree, 30 degrees, 45 degrees, and almost 90 degrees, respectively.

Specifically, in FIGS. 7A to 7D, for reducing the aforementioned error, a sensor 111-3 of which detecting range (or detecting angle) x is smaller than 30 degrees is implemented. Also, the sensor 111-3 is arranged at an arrangement angle y that is smaller than 30 degrees based on the second edge 50 surface of the display panel 110.

Referring to FIGS. 7A to 7D, it can be seen that in the same manner as in FIGS. 5A to 5D, the predetermined distance z decreases as the rotating angle of the display panel 110 increases.

However, it can be seen that an area in which an error may occur among the shadow portions, i.e., the area e that is outside the rotating range 30 of the display 110 even though it is within the predetermined distance z in the detecting angle x of the sensor 111-3, is reduced as compared to FIGS. 5A to 5D.

Thus, according to the one or more embodiments shown in FIGS. 7A to 7D, some small areas of the rotating range 30 may not be covered, but the aforementioned error can be reduced overall.

As described above, by arranging the sensor 111 having various detecting angles x in various arrangement angles y, various embodiments can be derived.

Figure 8:
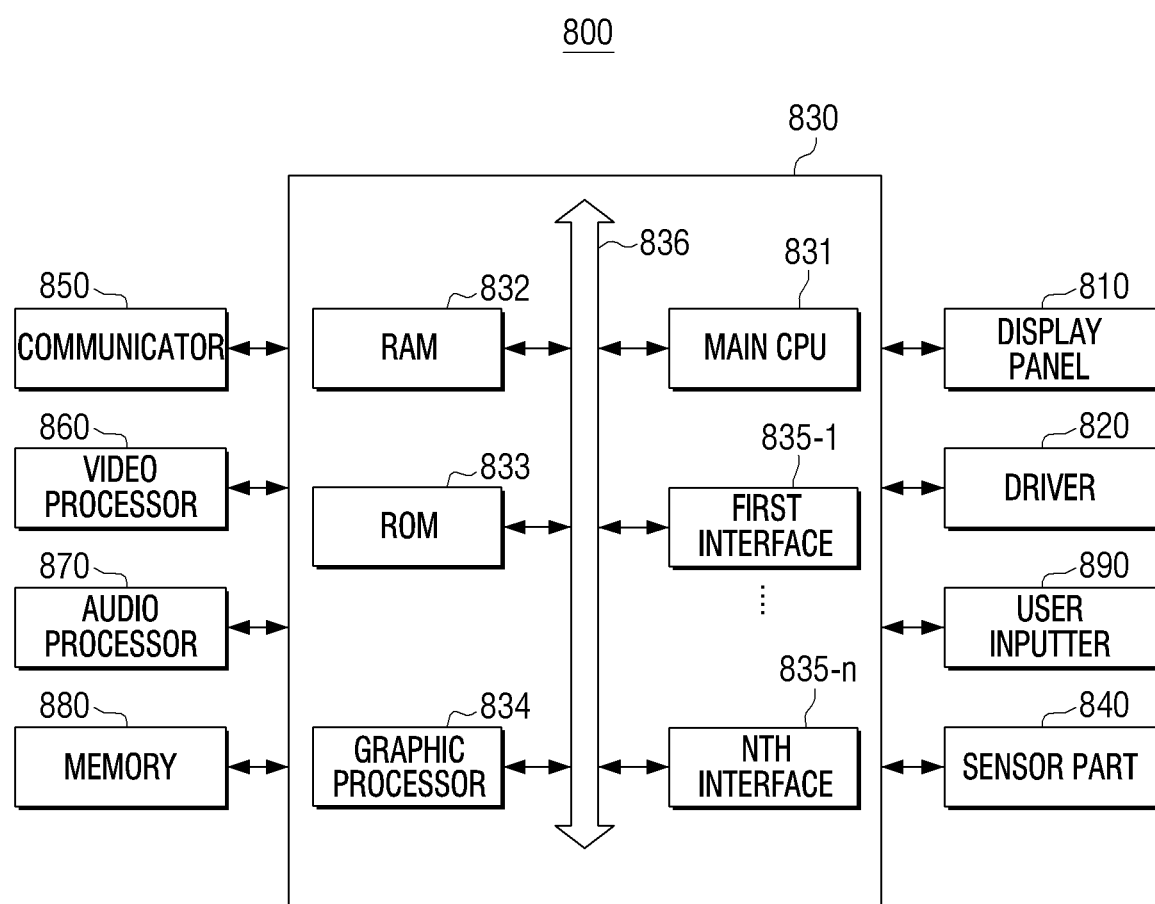
FIG. 8 is a detailed block diagram of a display apparatus according to an embodiment.

FIG. 8 is a detailed block diagram of a display apparatus 800 according to an embodiment. Referring to FIG. 8, a display apparatus 800 includes a display panel 810, a driver 820, a processor 830 (e.g., at least one processor), a sensor part 840, a communicator 850, a video processor 860, an audio processor 870, a memory 880, a user inputter 890, and an audio outputter. Meanwhile, explanation of overlapping or redundant contents regarding the same components as the components described above with reference to FIG. 2 will be omitted below.

The communicator 850 performs communication with various kinds of servers or external apparatuses according to various types of communication methods.

For this, the communicator 850 may include at least one communication module among a near field wireless communication module and a wireless LAN communication module. Here, a near field wireless communication module is a communication module performing data communication wirelessly with an external apparatus located in a near field, and may be, for example, a Bluetooth module, a ZigBee module, a Near Field Communication (NFC) module, etc. Also, a wireless LAN communication module is a module performing communication by being connected with an external network according to a wireless communication protocol such as WiFi, IEEE 802, etc.

The communicator 850 may further include a mobile communication module performing communication by accessing a mobile communication network according to various mobile communication standards such as 3rd Generation (3G), 3rd Generation Partnership Project (3GPP), Long Term Evolution (LTE), etc. Also, the communicator 850 may include at least one of wired communication modules such as a Universal Serial Bus (USB), Institute of Electrical and Electronics Engineers (IEEE) 1394, RS-232, etc. In addition, the communicator 850 may include a broadcasting receiving module receiving TV broadcasting.

Accordingly, the display apparatus 800 may be provided with various kinds of broadcasting services, Internet services, etc., through the communicator 850, and may connect to and communicate with various types of devices, such as a set top box, a smartphone, a media server, a network server, a media streaming device, a laptop computer, etc. with the display apparatus 800 may also connect to and communicate with a media device such as a sound bar, and may use information stored in a USB memory.

The video processor 860 is a component that processes an image signal including an image frame received through the communicator 850. At the video processor 860, various kinds of image processing such as decoding, scaling, noise filtering, frame rate conversion, resolution conversion, etc., for an image signal may be performed. An image frame processed as above may be displayed on the display panel 810.

The audio processor 870 is a component that processes an audio signal received through the communicator 850. At the audio processor 870, various kinds of processing such as decoding or amplification, noise filtering, etc., for an audio signal may be performed. An audio signal processed at the audio processor 870 may be output through the audio outputter.

The audio outputter is a component that outputs various kinds of audio signals and various kinds of notification sounds or voice messages processed at the audio processor 870. Further, the audio processor 870 may be implemented as a speaker, etc.

The user inputter 890 may receive input of various kinds of user commands for controlling the operations of the display apparatus 800. To this end, the user inputter 890 may be implemented as various input devices that can control the display apparatus 800 such as various kinds of buttons, a touch sensor, etc. Also, as a user command may be received through an external remote control, the user inputter 890 may include a remote control signal receiver, such as an infrared (IR) or radio frequency (RF) receiver.

The memory 880 stores various programs and data for operations of the display apparatus 800. In particular, in the memory 880, table information regarding a predetermined distance z according to a rotating angle of the display panel 110 may be stored.

To this end, the memory 880 may include various kinds of random access memories (RAMs), read-only memories (ROMs), and flash memories. However, it is understood that one or more other embodiments are not limited thereto, and the memory 880 may further include a storage medium such as a Hard Disk Drive (HDD), a Solid State Drive (SSD), an optical recording medium (such as a compact disk (CD), a digital versatile disk (DVD), a Blu-Ray disk, etc.), etc.

The sensor part 840 includes various kinds of sensors. For example, the sensor part 840 may include at least one of an image sensor, a proximity sensor, an illumination sensor, a pressure sensor, a light sensor, a temperature sensor, a humidity sensor, an acceleration sensor, various kinds of bio sensors, etc. In particular, the sensor part 840 may include the aforementioned distance sensor 111 for detecting distance to or presence of an external object.

As the display panel 810 and the driver 820 are the same or substantially similar components as the display panel 110 and the driver 120 in FIG. 2, redundant descriptions thereof are omitted below.

Meanwhile, according to an embodiment, as will be described below, the arrangement angle of the sensor 111 may be changed while the display panel 810 rotates. For this, the driver 820 may include components for changing the arrangement angle of the sensor 111. For example, the driver 820 may change the arrangement angle of the sensor 111 by using various kinds of actuators such as a motor, although it is understood that one or more other embodiments are not limited thereto The processor 830 controls the overall operations of the display apparatus 800 by using various types of programs, instructions, and data stored in the memory 880.

The processor 830 includes a RAM 832, a ROM 833, a graphic processor 834, a main central processing unit (CPU) 831, first to nth interfaces 835-1~835-n, and a bus 836. Here, the RAM 832, the ROM 833, the graphic processor 834, the main CPU 831, and the first to nth interfaces 835-1~835-*n* may be connected with one another through the bus 836.

The ROM 833 stores a set of instructions, etc., for system booting. When a turn-on instruction is input and power is supplied, the main CPU 831 copies the operating system (O/S) stored in the memory 880 to the RAM 832 according to the instruction stored in the ROM 833, and boots the system by executing the O/S. When booting is completed, the main CPU 831 copies various types of application programs stored in the memory 880 to the RAM 832, and performs various types of operations by executing the application programs copied to the RAM 832.

The graphic processor 834 generates a screen including various objects such as an icon, an image, a text, etc., by using an operation part and a rendering part. The operation part operates attribute values such as coordinate values, shapes, sizes, and colors by which each object will be displayed according to the layout of the screen by using a control command received from the user command inputter 890. Also, the rendering part generates screens in various layouts including objects, based on the attribute values operated at the operation part. The screens generated at the rending part are displayed on the screen of the display panel 810.

The main CPU 831 accesses the memory 880, and performs booting by using the O/S stored in the memory 880. Then, the main CPU 831 performs various operations by using various types of programs, contents, instructions, data, etc., stored in the memory 880.

The first to nth interfaces 835-1 to 835-*n* are connected to the aforementioned various components. One of the interfaces may be a network interface connected to an external apparatus through a network.

According to an embodiment, if a rotation event for rotating the display panel 810 occurs, as described above, the processor 830 may control the driver 820 such that the display panel 810 rotates, and if an object is detected within a predetermined distance or area in the rotating direction of the display panel 810 through the sensor 111 while the display panel 810 rotates, the processor 830 may control the driver 820 such that the rotation of the display panel 810 is stopped.

Here, according to an embodiment, after an object is detected within a predetermined distance and the rotation of the display panel 810 is stopped, if an object is not detected within the predetermined distance within a first predetermined time period, the processor 830 may control the driver 820 to resume the rotation of the display panel 810, and if an object is continuously detected during the first or a second predetermined time period, the processor 830 may control the driver 820 such that the display panel 810 goes back to the position before a rotation event occurred.

That is, in case a rotation event occurred in the first position, for example, and an object was detected while the display panel 810 rotated and the rotation is therefore stopped, the processor 830 determines whether the object was taken away or no longer in the rotational path within a predetermined time period. Accordingly, in case the object was taken away or no longer in the rotational path, the processor 830 may control the driver 820 such that the rotation is resumed from the place where the rotation stopped. If the object was not taken away or remains in the rotation path within a predetermined time period, the processor 830 may control the driver 820 such that the display panel 810 returns to the first position.

Meanwhile, according to another embodiment, if an object is detected within a predetermined distance while the display panel 810 rotates, the processor 830 may stop the rotation of the display panel 810 and control the driver 820 such that the display panel 810 returns to the position before the event occurred.

That is, unlike the embodiment described above, if a rotation event occurred in the first position and an object is detected while the display panel 810 rotates, the processor 830 may stop the rotation and immediately control the driver 820 such that the display panel 810 returns to the first position.

According to an embodiment, if a rotation event occurs, the processor 830 may control the sensor 111 to detect an object first before rotating the display panel 810, and may control the driver 820 such that the display panel 810 rotates only in case an object is not detected within a predetermined distance or a predetermined area, as described before. Further, even if an object is not detected prior to the rotation and the rotation of the display panel begins, the processor 830 may continue to control the sensor 111 to detect the object during the rotation as described in any of the aforementioned embodiments.

Meanwhile, according to another embodiment, in case the display panel 810 rotates in a forward direction, the processor 830 may increase the arrangement angles of the first and third sensors 111-1, 111-3 in a reverse direction as the rotating angle increases, and in case the display panel 810 rotates in a reverse direction, the processor 830 may increase the arrangement angles of the second and fourth sensors 111-2, 111-4 in a forward direction as the rotating angle increases.

FIGS. 9A to 9D are diagrams for illustrating such an embodiment. In FIGS. 9A to 9D, one sensor 111-3 arranged on the corner 3 is described below as an example, but the operations of the other sensors 111-1, 111-2, 111-4 may also be sufficiently understood with reference to the explanation regarding the operation of the sensor 111-3.

Referring to FIGS. 9A to 9D, as the rotating angle of the display panel 810 increases, the processor 830 may control the driver 820 such that the arrangement angle y of the sensor 111-3 increases.

Figure 9A:
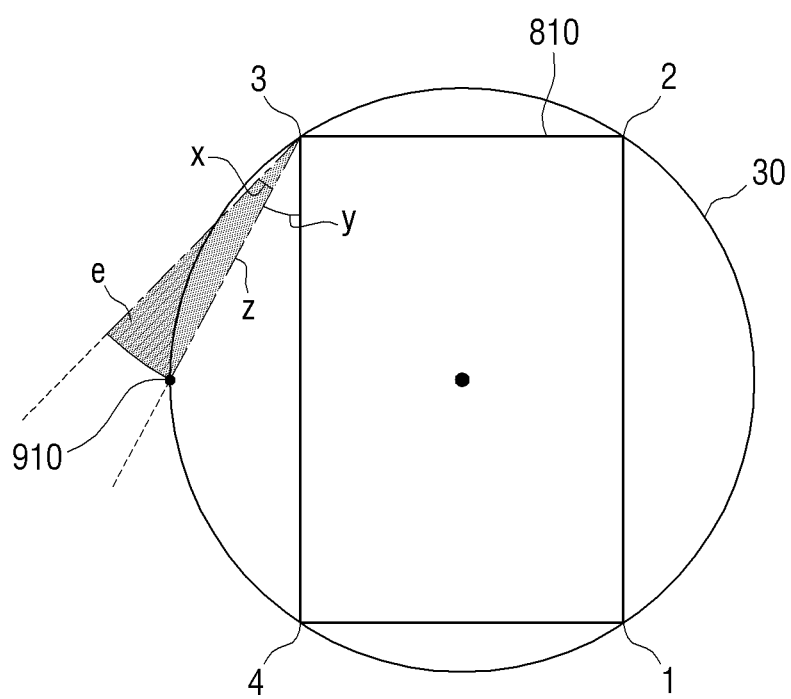
FIG. 9A is a diagram for illustrating still another embodiment wherein detecting distance of an obstacle changes according to a rotating angle of a display panel.

Specifically, if a rotation event occurs in the first position, the sensor 111-3 detects an object while having an arrangement angle y as illustrated in FIG. 9A so as to detect the maximum radius point 910 of the rotating range 30. This is similar to the embodiment of FIG. 5A or the embodiment of FIG. 7A, and can be confirmed through the fact that the e area still exists.

Figure 9B:
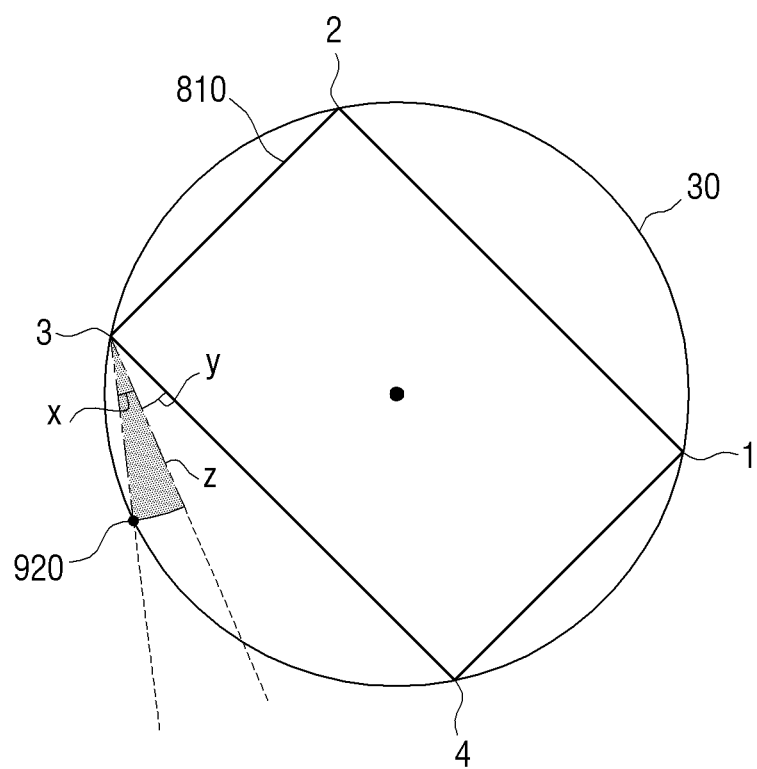
FIG. 9B is a diagram for illustrating still another embodiment wherein detecting distance of an obstacle changes according to a rotating angle of a display panel.
Figure 9C:
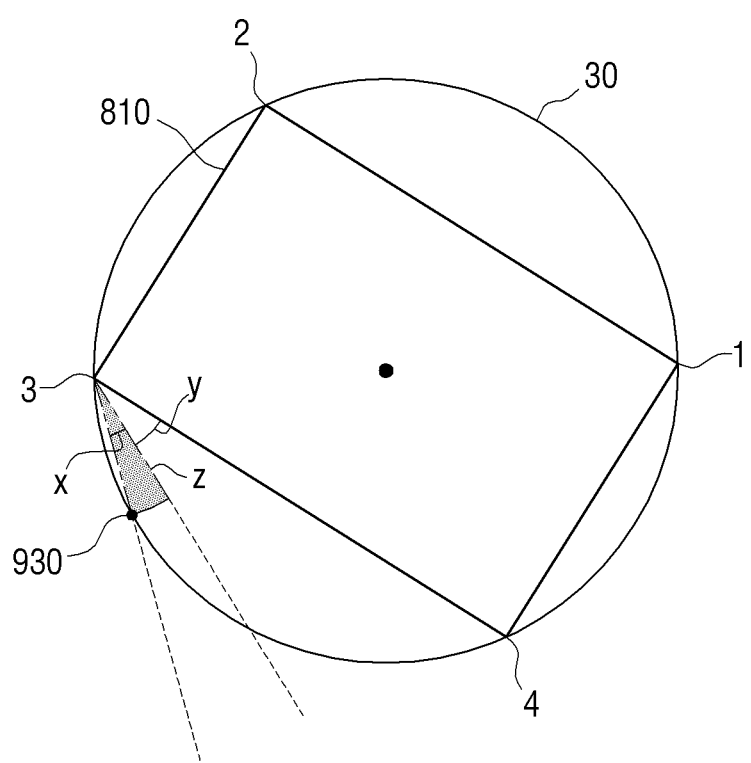
FIG. 9C is a diagram for illustrating still another embodiment wherein detecting distance of an obstacle changes according to a rotating angle of a display panel.
Figure 9D:
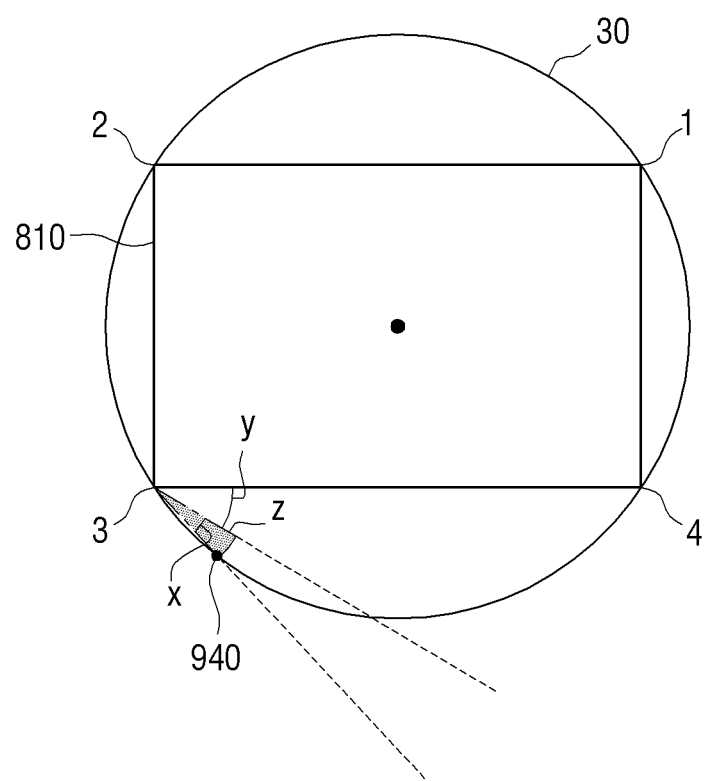
FIG. 9D is a diagram for illustrating still another embodiment wherein detecting distance of an obstacle changes according to a rotating angle of a display panel.

Subsequently, while the display panel 810 rotates in a forward direction, the processor 830 may decrease a predetermined distance z, and increase the arrangement angle y of the sensor 111-3 in a reverse direction as in FIGS. 9B to 9D so that a shadow portion (i.e., an area wherein rotation of the display panel stops when an object is detected) does not exist outside the rotating range 30. That is, referring to the shadow portions in FIGS. 9B to 9D, it can be seen that the e area does not exist, unlike in FIGS. 5B to 5D, or FIGS. 7B to 7D.

As previously described above, the first sensor 111-1 and the third sensor 111-3 are sensors used when rotating in a forward direction, and the second sensor 111-2 and the fourth sensor 111-4 are sensors used when rotating in a reverse direction. Thus, by increasing the arrangement angles of the first sensor 111-1 and the third sensor 111-3 in a reverse direction when rotating in a forward direction, and increasing the arrangement angles of the second sensor 111-2 and the fourth sensor 111-4 in a forward direction when rotating in a reverse direction, an area e in which the aforementioned error may occur when the display panel 810 rotates can be removed.

Meanwhile, according to still another embodiment, if an object is detected within a predetermined distance before or when the display panel 810 rotates, the processor 830 may control the display panel 810 to display a notification message.

Figure 10:
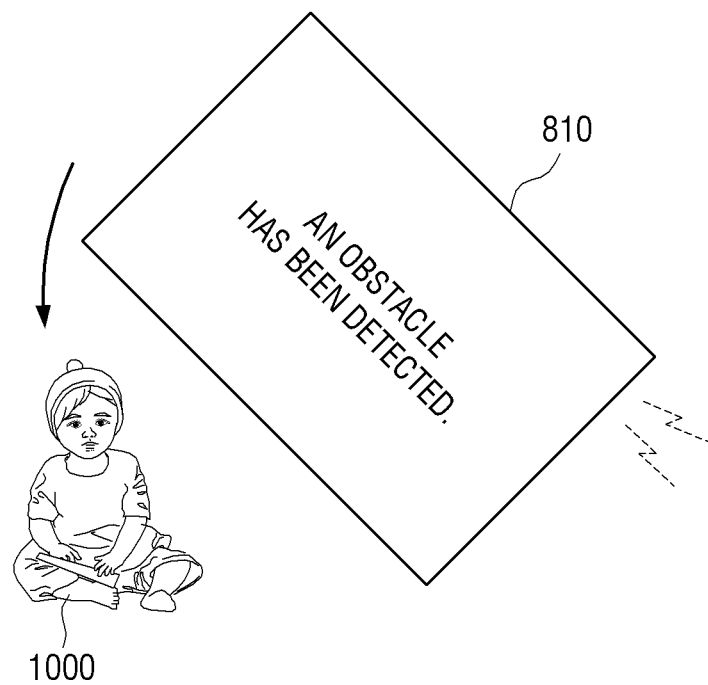
FIG. 10 is an exemplary diagram wherein a display apparatus outputs notification in case an obstacle is detected according to an embodiment.

FIG. 10 is an exemplary diagram in which the display apparatus 800 outputs a notification in case an obstacle is detected while (or before) the display panel 810 rotates according to an embodiment. As illustrated in FIG. 10, if an object is detected within a predetermined distance while the display panel 810 rotates, the processor 830 may stop the rotation of the display panel 810, and display a message notifying that an obstacle is detected in the rotating range 30 (such as "An obstacle has been detected") on the display panel 810 and/or output the message through the speaker.

Here, according to the aforementioned embodiment, the processor 830 may resume the rotation of the display panel 810 in case an object is taken away or no longer in the rotational path (i.e., no longer detected in within the predetermined distance or area) within a predetermined time period after the display panel 810 stopped. Accordingly, if a user recognizes the notification as described above and takes away the obstacle within a predetermined time period, the rotation of the display panel 810 may be resumed.

Figure 11:
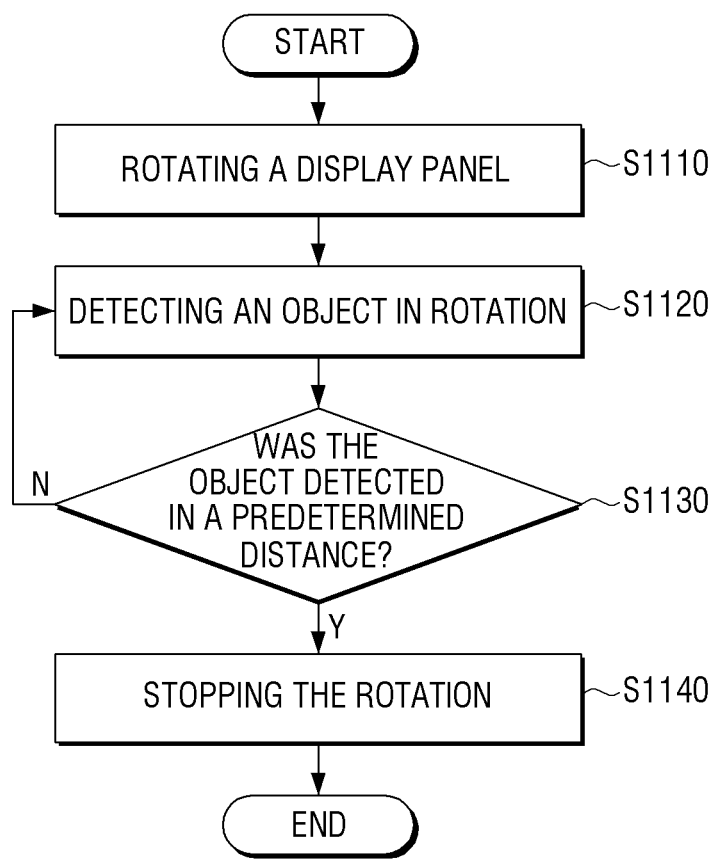
FIG. 11 is a flowchart illustrating a controlling method of a display apparatus according to an embodiment.

FIG. 11 is a flowchart illustrating a controlling method of a display apparatus 100, 800 according to an embodiment. Referring to FIG. 11, if an event for rotating the display panel 110, 810 in the first position occurs, the display apparatus 100, 800 may rotate the display panel 110, 810 toward the second position at operation S1110. Here, the display apparatus 100, 800 includes the display panel 110, 810, and a sensor 111 detecting distance to an external object, and the display panel 110, 810 rotates while its front surface maintains a specific facing direction.

Accordingly, the display apparatus 100, 800 may detect an object through the sensor 111 while the display panel 110, 810 rotates at operation S1120, and if an object is detected within a predetermined distance in the rotating direction of the display panel 110, 810 at operation S1130, Y, the display apparatus 100, 800 may stop the rotation of the display panel 110, 810 at operation S1140.

If an object is not detected within a predetermined distance at operation S1130, N, the display apparatus 100, 800 detects (i.e., senses for) an object within a predetermined distance while rotating the display panel 110, 810 until arriving in the second position at operation S1220.

Here, the predetermined distance may have different values according to the rotating angle by which the display panel 110, 810 is rotated based on the position of the display panel 110, 810 before the event occurred.

In particular, according to an embodiment, the predetermined distance may have a smaller value as the rotating angle by which the display panel 110, 810 rotated increases.

Meanwhile, the display panel 110, 810 may rotate in a forward direction from the first position to the second position perpendicular to the first position, and may rotate in a reverse direction from the second position to the first position. Here, the first position may be any one of a portrait position and a landscape position, and the second position may be the other one of the portrait position and the landscape position. Also, the forward direction may be any one of a counterclockwise direction and a clockwise direction, and the reverse direction may be the other one of the counterclockwise direction and the clockwise direction.

The sensor 111 may include a first sensor 111-1 and a second sensor 111-2 arranged to be respectively adjacent to different corners on the first edge 40 between two long edges on the display panel 110, 810, and a third sensor 111-3 and a fourth sensor 111-4 arranged to be respectively adjacent to different corners on the second edge 50 between the two edges.

Meanwhile, according to an embodiment, in case the display panel 110, 810 rotates in a forward direction, the display apparatus 100, 800 may detect an object by using the first sensor 111-1 (e.g., at least one first sensor 111-1) and the third sensor 111-3 (e.g., at least one third sensor 111-3) located in a diagonal direction to each other, and in case the display panel 110, 810 rotates in a reverse direction, the display apparatus 100, 800 may detect an object by using the second sensor 111-2 (e.g., at least one second sensor 111-2 and the fourth sensor 111-4 (e.g., at least one fourth sensor 111-4) located in a diagonal direction to each other.

Also, according to another embodiment, in case the display panel 110, 810 rotates in a forward direction, the display apparatus 100, 800 may increase the arrangement angles of the first sensor 111-1 and the third sensor 111-3 in a reverse direction as the rotating angle increases, and in case the display panel 110, 810 rotates in a reverse direction, the display apparatus 100, 800 may increase the arrangement angles of the second sensor 111-2 and the fourth sensor 111-4 in a forward direction.

Figure 12:
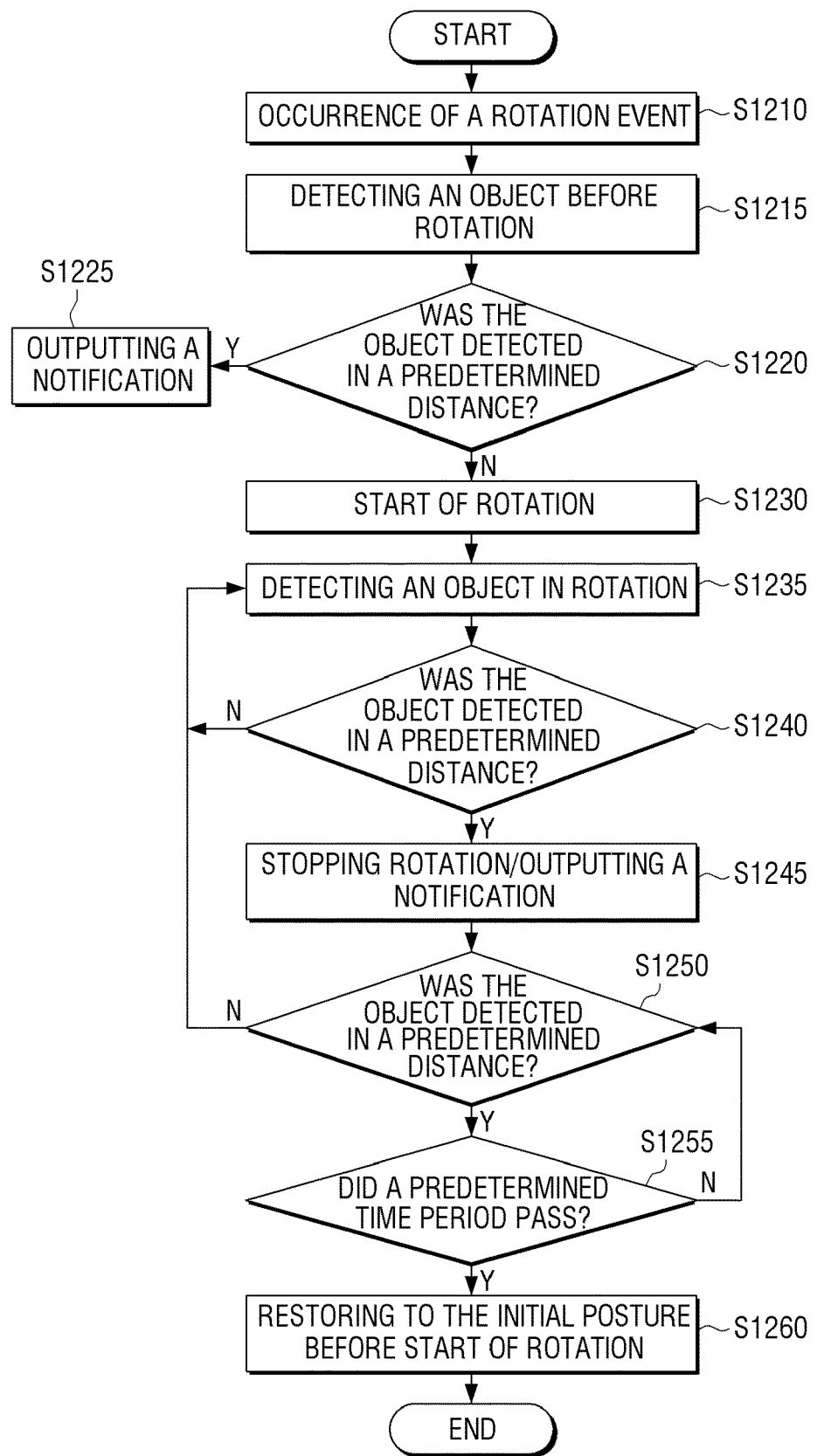
FIG. 12 is a flowchart illustrating a controlling method of a display apparatus according to another embodiment.

FIG. 12 is a flowchart illustrating a controlling method of a display apparatus 100, 800 according to another embodiment. Referring to FIG. 12, if a rotation event occurs while the display panel 110, 810 is in the first position at operation S1210, the display apparatus 100, 800 may detect an object before rotating the display panel 110, 810 at operation S1215.

Accordingly, if an object is detected within a predetermined distance or area at operation S1220, Y, the display apparatus 100, 800 may not rotate the display panel 110, 810, and may output a notification notifying that an obstacle has been detected at operation S1225.

If an object is not detected within a predetermined distance or area at operation S1220, N, the display apparatus 100, 800 rotates the display panel 110, 810 in a forward direction toward the second position at operation S1230, and detects an object (i.e., senses for an object) during the rotation of the display panel 110, 810 at operation S1235.

Accordingly, if an object is detected within a predetermined distance or area at operation S1240, Y, the display apparatus 100, 800 may stop the rotation of the display panel 110, 810, and output a notification notifying that an obstacle has been detected at operation S1245.

If an object is not detected within a predetermined distance at operation S1240, N, the display apparatus 100, 800 rotates the display panel 110, 810 until the display panel 110, 810 reaches the second position, and detects an object within a predetermined distance or area at operation S1235.

Meanwhile, the display apparatus 100, 800 continuously detects an object during a predetermined time period after the rotation of the display panel 110, 810 is stopped at operation S1250. Accordingly, if an object is not detected within a predetermined time period at operation S1250, N, the display apparatus 100, 800 resumes the rotation of the display panel 110, 810. Then, the display apparatus 100, 800 detects an object within a predetermined distance or area during the resumed rotation of the display panel 110, 810 at operation S1235.

If an object is continuously or repeatedly detected during a predetermined time period or area at operation 51255, Y, the display apparatus 100, 800 rotates the display panel 110, 810 in a reverse direction and restores the position of the display panel 110, 810 to the initial position before the display panel 110, 810 rotated, i.e., the first position at operation S1260.

According to embodiments as described above, a display apparatus can detect surrounding obstacles and rotate a display panel safely.

Meanwhile, one or more embodiments may be implemented as software including instructions stored in machine-readable storage media, which can be read by machines (e.g., computers). Here, the machines refer to apparatuses that call instructions stored in a storage medium, and can operate according to the called instructions, and the apparatuses may include the display apparatus 100, 800 according to the aforementioned embodiments.

In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term "non-transitory" only means that a storage medium does not include signals, and is tangible, but does not indicate whether data is stored in the storage medium semi-permanently or temporarily.

Also, methods according to one or more embodiments described above may be provided while being included in a computer program product. A computer program product refers to a product, and it can be traded between a seller and a buyer. A computer program product can be distributed on-line in the form of a storage medium that is readable by machines (e.g.: a compact disc read only memory (CD-ROM)), or through an application store (e.g., GOOGLE PLAY STORE). In the case of on-line distribution, at least a portion of a computer program product may be stored in a storage medium such as a server of a manufacturer, a server of the application store, and the memory of a relay server at least temporarily, or may be generated temporarily.

Further, each of the components according to the aforementioned various embodiments (e.g., a module, a part, or a program) may consist of a singular object or a plurality of objects. Also, among the aforementioned corresponding sub components, some sub components may be omitted, or other sub components may be further included in the various embodiments. Generally or additionally, some components (e.g., a module or a program) may be integrated as an object, and perform the functions that were performed by each of the components before integration identically or in a similar manner. Operations performed by a module, a program, or other components according to the various embodiments may be executed sequentially, in parallel, repetitively, or heuristically. Or, at least some of the operations may be executed in a different order, or omitted, or other operations may be added.

The descriptions above are merely an exemplary explanation of the technical idea of the disclosure, and various amendments and modifications may be made by those having ordinary skill in the technical field to which the disclosure belongs, within the scope of the intrinsic characteristics of the disclosure. Also, embodiments according to the disclosure are not for limiting the technical idea of the disclosure, but for explaining the technical idea, and the scope of the technical idea of the disclosure is not limited by these embodiments. Accordingly, the scope of protection of the disclosure should be interpreted based on the appended claims, and all technical ideas within an equivalent scope thereto should be interpreted to belong to the scope of protection of the disclosure.

What is claimed is:

1. A display apparatus comprising:
a display panel configured to rotate with a front surface maintaining a constant direction;
at least one sensor configured to detect whether an object exists within a predetermined distance along a rotational path of the display panel; and
a processor configured to:
based on detecting, via the at least one sensor, the object within the predetermined distance along the rotational path of the display panel, control the display panel to not rotate,
wherein the predetermined distance has different values according to a rotating angle by which the display panel has rotated from a position of the display panel before the display panel rotates.

2. The display apparatus of claim 1, wherein the predetermined distance has a decreasing value as the rotating angle by which the display panel has rotated increases.

3. The display apparatus of claim 1, wherein the display panel is rotatable in a forward direction from a first position to a second position perpendicular to the first position, and is rotatable in a reverse direction, opposite the forward direction, from the second position to the first position.

4. The display apparatus of claim 1, wherein the at least one sensor is arranged adjacent to at least one corner of the display panel.

5. The display apparatus of claim 4, wherein the at least one sensor comprises a first sensor and a second sensor respectively arranged adjacent to different corners on a first edge among two long edges on the display panel in a rectangular form, and a third sensor and a fourth sensor respectively arranged adjacent to different corners on a second edge among the two long edges.

6. The display apparatus of claim 5, wherein the processor is further configured to:
based on the display panel rotating in a forward direction, detect the object via the first sensor and the third sensor located diagonally from each other; and
based on the display panel rotating in a reverse direction, opposite the forward direction, detect the object via the second sensor and the fourth sensor located diagonally from each other.

7. The display apparatus of claim 6, wherein:
the first sensor and the third sensor are arranged such that a detecting direction is toward the forward direction; and
the second sensor and the fourth sensor are arranged such that the detecting direction is toward the reverse direction.

8. The display apparatus of claim 7, wherein the processor is further configured to:
based on the display panel rotating in the forward direction, control to increase arrangement angles of the first sensor and the third sensor in the reverse direction as the rotating angle increases; and
based on the display panel rotating in the reverse direction, control to increase arrangement angles of the second sensor and the fourth sensor in the forward direction as the rotating angle increases.

9. The display apparatus of claim 1, wherein the processor is configured to:
based on detecting, via the at least one sensor, the object within the predetermined distance while the display panel rotates, control the display panel to stop rotating.

10. The display apparatus of claim 9, wherein the processor is further configured to:
based on an object not being detected within the predetermined distance within a predetermined time period after the object is detected and rotation of the display panel is stopped, control the display panel to resume the rotation; and
based on the object being continuously detected within the predetermined distance during the predetermined time period, control the display panel to return to a position before the event occurred.

11. The display apparatus of claim 1, wherein the processor is configured to:
based on detecting, via the at least one sensor, the object within the predetermined distance before the display panel rotates, control the display panel to not rotate.

12. The display apparatus of claim 11, wherein the processor is further configured to:
based on detecting, via the at least one sensor, that the object does not exist within the predetermined distance before the display panel rotates, control the display panel to rotate along the rotational path; and
based on detecting, via the at least one sensor, the object within the predetermined distance while the display panel rotates, control the display panel to stop rotating.

13. The display apparatus of claim 1, wherein the processor is further configured to, based on the object being detected within the predetermined distance before or while the display panel rotates, control the display panel to display a notification message.

14. The display apparatus of claim 1, wherein the processor is further configured to based on the object being detected within the predetermined distance while the display panel rotates, stop the rotation of the display panel and control the display panel to return to a position before the display panel rotates.

15. A controlling method of a display apparatus comprising a display panel configured to rotate with a front surface maintaining a constant direction, the controlling method comprising:

detecting, via at least one sensor, whether an object exists within a predetermined distance along a rotational path of the display panel; and
based on detecting the object within the predetermined distance along the rotational path of the display panel, controlling the display panel to not rotate,
wherein the predetermined distance has different values according to a rotating angle by which the display panel has rotated from a position of the display panel before the display panel rotates.

16. The controlling method of claim 15, wherein the predetermined distance has a decreasing value as the rotating angle by which the display panel has rotated increases.

17. The controlling method of claim 15, wherein the display panel is rotatable in a forward direction from a first position to a second position perpendicular to the first position, and is rotatable in a reverse direction, opposite the forward direction, from the second position to the first position.

18. The controlling method of claim 15, further comprising:
based on detecting, via the at least one sensor, the object within the predetermined distance while the display panel rotates, controlling the display panel to stop rotating.

19. The controlling method of claim 15, further comprising:
based on detecting, via the at least one sensor, the object within the predetermined distance before the display panel rotates, controlling the display panel to not rotate.

20. The controlling method of claim 19, further comprising:
based on detecting, via the at least one sensor, that the object does not exist within the predetermined distance before the display panel rotates, controlling the display panel to rotate along the rotational path; and
based on detecting, via the at least one sensor, the object within the predetermined distance while the display panel rotates, controlling the display panel to stop rotating.

* * * * *